(12) United States Patent
Swamynathan et al.

(10) Patent No.: US 8,301,471 B2
(45) Date of Patent: Oct. 30, 2012

(54) METHODS AND SYSTEMS FOR MANAGING AN INVENTORY OF TELEPHONE NUMBERS

(75) Inventors: Shivakumar Swamynathan, Wesley Chapel, FL (US); Bhaskar R. Gudlavenkatasiva, Tampa, FL (US); Rama Krishna Gude, Tampa, FL (US); Sunil Kumar, Tampa, FL (US); Nityanand Sharma, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 926 days.

(21) Appl. No.: 12/120,045

(22) Filed: May 13, 2008

(65) Prior Publication Data
US 2009/0287533 A1    Nov. 19, 2009

(51) Int. Cl.
*G06Q 10/00* (2012.01)
*G01R 21/133* (2006.01)

(52) U.S. Cl. .............................. 705/7; 705/412
(58) Field of Classification Search ............... 705/7.31
See application file for complete search history.

(56) References Cited

U.S. PATENT DOCUMENTS

| 2008/0046477 A1* | 2/2008 | Schultz | 707/201 |
| 2008/0065570 A1* | 3/2008 | Schultz | 705/412 |

OTHER PUBLICATIONS

"Eftia Announces Strategic Partnership Agreement" with ViryaNet PR Newswire. New York: Apr 30, 2002. p. 1.*

* cited by examiner

*Primary Examiner* — Garcia Ade

(57) ABSTRACT

A system and method in accordance with exemplary embodiments may include storing telephone number inventory data using a database associated with a network, receiving, from a user system, a request for telephone number forecast data, forecasting future telephone number usage based on at least a history of telephone number inventory data, and providing, to the user system, telephone number forecast data based on at least the forecast of future telephone number usage.

17 Claims, 25 Drawing Sheets

102

300

| Forecasting Report Name | Feature | Benefit |
|---|---|---|
| Telephone Number Utilization Report | Provides a view of utilization data | Automated report submission |
| Telephone Number Forecast Report | Provides a view of 5-year forecast data | Automated report submission |
| Twelve Month Forecast Report | Provides a month-by-month one year forecast of expected demand for telephone number resources | Automated data collection and report submission |
| Jeopardy Analysis Report | Provides an evaluation of exhaustion at various levels | Automated identification of areas nearing exhaustion |
| Outward Activity History and Inward Activity History Report | Provides a historical aggregate view of new connect and disconnect activity at various levels | Automated tracking of growth and abnormalities |
| Telephone Number Status Report | Provides a display of data associated with telephone number status | Automated display of summary information of telephone numbers by telephone number status |
| LNP Analysis Report | Provides display of ported out telephone numbers by various levels | Automated quick view of installed, workings and ported out telephone numbers |
| LNP History Report | Provides a chronological view of LNP activity during a specified interval of time | Automated quick view of historical data |
| True Spare Analysis Report | Provides a display of true space telephone numbers by various levels | Automated quick view of installed and available telephone numbers |
| New Codes/K-Block Report | Provides display of new codes/block not yet in service of newly in service | Automated generation of information for new blocks |
| K-Block Analysis Report | Provides a quick view of all uncontaminated or near-uncontaminated K-Blocks | Automated identification of blocks available for donation and/or assignment |
| Telephone Number Detail Report | Provides information for a single telephone number or a range of telephone numbers | Automated display of complete details at the single telephone number level |
| Telephone Number History Report | Provides a display of a historical view of a single telephone number | Automated display of complete historical details at the single telephone number level |
| Donation Forecast Report | Provides calculation and display of summary information, based on the telephone number forecast, to suggest... | Automated high level view of blocks available for donation in rate center |
| Code and Block Requests Report | Provides a series of screens that permit a user to create, change or delete a code/block request | Automated submission of code/block requests |

TN Utilization – Input Parameters

Input Parameters

Month  [ 01/2008 ▼ ] }402

Levels to expand:  [ 1 ▼ ] }404

Filter by

OCN:  [ ALL ▼ ]

Site/WC and State:  [ 01/2008 ▼ ] [ ALL ▼ ]

Rate Center and State:  [ 01/2008 ▼ ] [ CA ▼ ]  }406

CLLI:  [        ]

NPA:  [ ALL ▼ ]

NXX:  [        ]

[Submit] [Schedule] [Reset] [Column Organizer] [Help] [Close]
  408      410      412        414           416    418

TN Utilization

Month: 01/2008 | OCN: ALL | RC: ALL | RC State: CA | Site/WC: ALL | Site/WC State: ALL | CLLI: ALL |
NPA: ALL | NXX: ALL |

TN Utilization Analysis | TN Utilization Grid

Retrieve/Save
Report ID [____]  [Send Utilization Data] [Save] [Export Data] [Print]

502 → Levels to expand: [1 ▼]  [Column Organizer] ← 504  [Submit] ← 506

| Location | | | | Measures | | | | | | |
|---|---|---|---|---|---|---|---|---|---|---|
| RC-ST | RC | NPA | NXX | K_BLOCK | •INST | •AVAL | •UNAV | •ASGN | •ADMIN | •RSVD | •AGNG | •INTM |
| ☑-CA [Surface Sum] | | | | | 9,158,996 | 1,867,261 | 7,291,735 | 6,507,000 | 422,463 | 34,644 | 325,448 | 2,180 |
| CA | ☑ ALAMITOS [Surface Sum] | | | | 257,000 | 57,301 | 199,699 | 172,754 | 19,090 | 1,071 | 6,784 | 0 |
| | ALAMITOS | ☑-562 [Surface Sum] | | | 257,000 | 57,301 | 199,699 | 172,754 | 19,090 | 1,071 | 6,784 | 0 |
| | | 562 | ☑-342 [Surface Sum] | | 3,000 | 819 | 2,181 | 2,087 | 58 | 3 | 33 | 0 |
| | | | 342 | ☑ 2 | 1,000 | 65 | 935 | 935 | 0 | 0 | 0 | 0 |
| | | | | ☑ 7 | 1,000 | 81 | 919 | 895 | 0 | 3 | 24 | 0 |
| | | | | ☑ 9 | 1,000 | 673 | 327 | 257 | 58 | 0 | 9 | 0 |
| | | | ☑ +430 | | 10,000 | 849 | 9,151 | 7,791 | 983 | 38 | 339 | 0 |
| | | | ☑ +431 | | 10,000 | 1,242 | 8,758 | 7,599 | 770 | 69 | 320 | 0 |
| | | | ☑ +433 | | 10,000 | 1,452 | 8,548 | 6,243 | 1,712 | 114 | 479 | 0 |
| | | | ☑ +434 | | 10,000 | 1,677 | 8,323 | 6,089 | 1,615 | 97 | 552 | 0 |
| | | | ☑ +438 | | 10,000 | 2,320 | 7,680 | 5,761 | 1,397 | 64 | 458 | 0 |
| | | | ☑ +439 | | 10,000 | 2,669 | 7,331 | 5,721 | 1,109 | 61 | 440 | 0 |
| | | | ☑ +493 | | 10,000 | 1,342 | 8,658 | 7,518 | 804 | 31 | 305 | 0 |
| | | | ☑ +494 | | 10,000 | 2,004 | 7,996 | 5,967 | 1,484 | 66 | 479 | 0 |

510 → [Return to Input Parameters]   [Help]   [Close]    Query took: 🕐 2 sec ← 508

TN Utilization

Month: 01/2008 | OCN: ALL | RC: ALL | RC State: CA | Site/WC: ALL | Site/WC State: ALL | CLLI: ALL |
NPA: ALL | NXX: ALL |

TN Utilization Analysis | TN Utilization Grid          704

Retrieve/Save
Report ID [           ]       [Send Utilization Data]   [Save]   [Export Data]   [Print]

Levels to expand: [1 ▼]   [Column Organizer]   [Submit]

702

| Location | | | | Measures | | | | | | |
|---|---|---|---|---|---|---|---|---|---|---|
| NPA | NXX | RC_ST | RC | CLLI | •INST | •AVAL | •UNAV | •ASGN | •ADMIN | •RSVD | •AGNG | •INTM |
| ☑ -209 [Surface Sum] | | | | | 77,000 | 16,432 | 60,568 | 52,333 | 4,943 | 173 | 3,119 | 0 |
| 209 | ☑ -239 [Surface Sum] | | | | 10,000 | 818 | 9,182 | 7,722 | 935 | 31 | 494 | 0 |
| | | ☑ -CA [Surface Sum] | | | 10,000 | 818 | 9,182 | 7,722 | 935 | 31 | 494 | 0 |
| | | CA | ☑ -MANTECA [Surface Sum] | | 10,000 | 818 | 9,182 | 7,722 | 935 | 31 | 494 | 0 |
| | | | MANTECA | ☑ -MNTCC AXG82A | 1,000 | 667 | 333 | 267 | 50 | 0 | 16 | 0 |
| | ☑ +364 | | | | 1,000 | 462 | 538 | 408 | 95 | 2 | 33 | 0 |
| | ☑ +387 | | | | 7,000 | 3,364 | 3,636 | 2,942 | 464 | 12 | 218 | 0 |
| | ☑ +392 | | | | 1,000 | 604 | 396 | 360 | 21 | 0 | 15 | 0 |
| | ☑ +563 | | | | 10,000 | 791 | 9,209 | 8,360 | 400 | 28 | 421 | 0 |
| | ☑ +599 | | | | 2,000 | 1,329 | 671 | 624 | 21 | 6 | 20 | 0 |
| | ☑ +759 | | | | 10,000 | 832 | 9,168 | 7,870 | 816 | 23 | 459 | 0 |
| | ☑ +823 | | | | 10,000 | 1,143 | 8,857 | 7,638 | 693 | 26 | 500 | 0 |
| | ☑ +824 | | | | 10,000 | 1,001 | 8,999 | 7,654 | 808 | 22 | 515 | 0 |
| | ☑ +825 | | | | 9,000 | 1,804 | 7,196 | 6,326 | 519 | 15 | 336 | 0 |
| | ☑ +858 | | | | | | | | | | | |

[Return to Input Parameters]   [Help]   [Close]    Query took: 🕐 1 sec

FIGURE 7

Outward Activity Report

Start Month: 01/2008 | End Month: 01/2008 | OCN: ALL | RC: ALL | RC State: CA | Site/WC: ALL | Site/WC State: ALL |
CLLI: ALL | NPA: 209 | NXX: ALL |

| RANGE | RES | BUS | SDT | UNKN | OTH | TOT | INST | RES AVG | BUS AVG | SDT AVG | UNKN AVG | OTH AVG | TOT AVG | INST AVG |
|---|---|---|---|---|---|---|---|---|---|---|---|---|---|---|
| 01/2008 to 01/2008 | 442 | 112 | 0 | 0 | 93 | 647 | 77,000 | 442 | 112 | 0 | 0 | 93 | 647 | 77,000 |

Levels to expand: 3 ▶  Column Organizer   Submit

| Time | Location | | Measures | | | | | | |
|---|---|---|---|---|---|---|---|---|---|
| MONTH | RC ST | RC | CLLI | • RES | • BUS | • SDT | • UNKN | • OTH | • TOT | • INST |
| 200801 | ☑ - CA [Surface Sum] | | | 442 | 112 | 0 | 0 | 93 | 647 | 77,000 |
| | CA | ☑ - CLEMENTS [Surface Sum] | | 4 | 0 | 0 | 0 | 4 | 8 | 2,000 |
| | | CLEMENTS | ☑ + CLEMCAXFRS9 | 4 | 0 | 0 | 0 | 4 | 8 | 2,000 |
| | | ☑ - DOS PALOS [Surface Sum] | | 44 | 5 | 0 | 0 | 3 | 52 | 9,000 |
| | | DOS PALOS | ☑ + DSPLCAXFDSO | 44 | 4 | 0 | 0 | 3 | 51 | 8,000 |
| | | | ☑ + ORMACAXFRLO | 0 | 1 | 0 | 0 | 0 | 1 | 1,000 |
| | | ☑ - FARMINGTON [Surface Sum] | | 9 | 0 | 0 | 0 | 0 | 9 | 2,000 |
| | | FARMINGTON | ☑ + FRTNCAXFRS8 | 9 | 0 | 0 | 0 | 0 | 9 | 2,000 |
| | | ☑ - LINDEN [Surface Sum] | | 10 | 4 | 0 | 0 | 2 | 16 | 4,000 |
| | | LINDEN | ☑ + LNDNCAXFRSA | 10 | 4 | 0 | 0 | 2 | 16 | 4,000 |
| | | ☑ - MANTECA [Surface Sum] | | 317 | 93 | 0 | 0 | 77 | 487 | 49,000 |
| | | MANTECA | ☑ + LTHCAXFRS3 | 23 | 24 | 0 | 0 | 5 | 52 | 9,000 |
| | | | ☑ + MNTCCAXG82A | 294 | 69 | 0 | 0 | 72 | 435 | 40,000 |
| | | ☑ - RIPON [Surface Sum] | | 53 | 10 | 0 | 0 | 7 | 70 | 10,000 |
| | | RIPON | ☑ + RIPNCAXFRS5 | 53 | 10 | 0 | 0 | 7 | 70 | 10,000 |
| | | ☑ - SNELLING [Surface Sum] | | 5 | 0 | 0 | 0 | 0 | 5 | 1,000 |
| | | SNELLING | ☑ + SNNGCAXGDSO | 5 | 0 | 0 | 0 | 0 | 5 | 1,000 |

Query took: 2 sec

Return to Input Parameters   Help   Close   Export Data   Print

Forecast Detail

Month: 01/2008 | Display Months: 12 | OCN: ALL | RC: ALL | RC State: CA | CLLI: ALL | NPA: 209 | TN Type: ALL

| MONTH | IN | OUT RES | OUTBUS | UNAV | AVAIL | WKG | AGNG | PNDG | UNK | RSVD | POUT | EXCL | TRSP | OTSP |
|---|---|---|---|---|---|---|---|---|---|---|---|---|---|---|
| 2007/02 | 0 | 0 | 0 | 57,896 | 19,104 | 53,406 | 2,865 | 0 | 0 | 582 | 1,043 | 0 | 19,104 | 0 |
| 2007/03 | 662 | 519 | 110 | 57,876 | 19,124 | 53,301 | 2,924 | 0 | 0 | 596 | 1,055 | 0 | 19,124 | 0 |
| 2007/04 | 760 | 517 | 144 | 57,872 | 19,128 | 53,178 | 3,008 | 0 | 0 | 616 | 1,070 | 0 | 19,128 | 0 |
| 2007/05 | 656 | 465 | 134 | 57,732 | 19,268 | 53,119 | 2,883 | 0 | 0 | 640 | 1,090 | 0 | 19,268 | 0 |
| 2007/06 | 746 | 537 | 177 | 57,554 | 19,446 | 52,948 | 2,909 | 0 | 0 | 601 | 1,096 | 0 | 19,446 | 0 |
| 2007/07 | 635 | 514 | 158 | 57,388 | 19,612 | 52,618 | 2,950 | 0 | 0 | 589 | 1,231 | 0 | 19,612 | 0 |
| 2007/08 | 774 | 672 | 126 | 57,044 | 19,956 | 51,870 | 3,149 | 0 | 0 | 246 | 1,779 | 0 | 19,956 | 0 |
| 2007/09 | 722 | 609 | 131 | 56,968 | 20,032 | 51,158 | 3,313 | 0 | 0 | 222 | 2,275 | 0 | 20,032 | 0 |
| 2007/10 | 733 | 569 | 124 | 56,791 | 20,209 | 50,658 | 3,368 | 0 | 0 | 230 | 2,535 | 0 | 20,209 | 0 |
| 2007/11 | 1,006 | 593 | 167 | 56,740 | 20,260 | 50,447 | 3,289 | 0 | 0 | 221 | 2,783 | 0 | 20,260 | 0 |
| 2007/12 | 698 | 537 | 165 | 56,520 | 20,480 | 50,006 | 3,347 | 0 | 0 | 182 | 2,985 | 0 | 20,480 | 0 |
| 2008/01 | 516 | 442 | 112 | 56,083 | 20,917 | 49,542 | 3,119 | 0 | 0 | 173 | 3,149 | 0 | 20,917 | 0 |
| 2008/02 | 654 | 493 | 126 | 55,016 | 21,984 | 49,667 | 3,094 | 0 | 0 | 406 | 1,839 | 0 | 21,984 | 0 |
| 2008/03 | 710 | 535 | 136 | 55,103 | 21,897 | 49,716 | 3,091 | 0 | 0 | 391 | 1,905 | 0 | 21,897 | 0 |
| 2008/04 | 714 | 535 | 138 | 55,367 | 21,633 | 49,757 | 3,260 | 0 | 0 | 373 | 1,977 | 0 | 21,633 | 0 |
| 2008/05 | 709 | 538 | 137 | 55,495 | 21,505 | 49,791 | 3,298 | 0 | 0 | 354 | 2,052 | 0 | 21,505 | 0 |
| 2008/06 | 715 | 543 | 138 | 55,545 | 21,455 | 49,825 | 3,259 | 0 | 0 | 329 | 2,132 | 0 | 21,455 | 0 |
| 2008/07 | 712 | 544 | 134 | 55,639 | 21,361 | 49,859 | 3,258 | 0 | 0 | 304 | 2,218 | 0 | 21,361 | 0 |
| 2008/08 | 719 | 547 | 133 | 55,753 | 21,247 | 49,898 | 3,273 | 0 | 0 | 282 | 2,300 | 0 | 21,247 | 0 |
| 2008/09 | 714 | 537 | 134 | 55,849 | 21,151 | 49,941 | 3,278 | 0 | 0 | 286 | 2,344 | 0 | 21,151 | 0 |
| 2008/10 | 712 | 529 | 134 | 55,901 | 21,099 | 49,990 | 3,272 | 0 | 0 | 290 | 2,349 | 0 | 21,099 | 0 |
| 2008/11 | 710 | 527 | 136 | 55,895 | 21,105 | 50,037 | 3,228 | 0 | 0 | 297 | 2,333 | 0 | 21,105 | 0 |
| 2008/12 | 686 | 521 | 132 | 55,855 | 21,145 | 50,070 | 3,185 | 0 | 0 | 304 | 2,296 | 0 | 21,145 | 0 |
| 2009/01 | 685 | 521 | 130 | 55,831 | 21,169 | 50,104 | 3,177 | 0 | 0 | 312 | 2,238 | 0 | 21,169 | 0 |
| Grand Total | 16,348 | 12,344 | 3,156 | 1,353,713 | 494,287 | 1,221,016 | 75,797 | 0 | 0 | 8,826 | 48,074 | 0 | 494,287 | 0 |

[ Return to Input Parameters ]  [ Help ]  [ Close ]  [ Export Data ]

TN Forecast – Rate Center View

Month: 01/2008 | OCN: ALL | NPA: 209 415 909 | RC: ALL | RC State: CA | CLLI: ALL | Forecasting Display: Pooling Areas Only Retrieve/Save
Report ID

[ Send Forecast Data ]   [ Save ]   [ Export Data ]

| RC | RC ST | Q1C | Q1B | Q2C | Q2B | Q3C | Q3B | Q4C | Q4B | Y1C | Y1B | Q5C | Q5B | Q6C | Q6B | Q7C | Q7B | Q8C | Q8B | Y |
|---|---|---|---|---|---|---|---|---|---|---|---|---|---|---|---|---|---|---|---|---|
| ARROWHEAD | CA | 0 | 0 | 0 | 0 | 0 | 0 | 0 | 0 | 0 | 0 | 0 | 0 | 0 | 0 | 0 | 0 | 0 | 0 | 0 |
| BIGBEAR CY | CA | 0 | 0 | 0 | 0 | 0 | 0 | 0 | 0 | 0 | 0 | 0 | 0 | 0 | 0 | 0 | 0 | 0 | 0 | 0 |
| BKBEAR LK | CA | 0 | 0 | 0 | 0 | 0 | 0 | 0 | 0 | 0 | 0 | 0 | 0 | 0 | 0 | 0 | 0 | 0 | 0 | 0 |
| CALIMESA | CA | 0 | 0 | 0 | 0 | 0 | 0 | 0 | 0 | 0 | 0 | 0 | 0 | 0 | 0 | 0 | 0 | 0 | 0 | 0 |
| CHINO | CA | 0 | 0 | 0 | 0 | 0 | 0 | 0 | 0 | 0 | 0 | 0 | 0 | 0 | 0 | 0 | 0 | 0 | 0 | 0 |
| CLAREMONT | CA | 0 | 0 | 0 | 0 | 0 | 0 | 0 | 0 | 0 | 0 | 0 | 0 | 0 | 0 | 0 | 0 | 0 | 0 | 0 |
| CLEMENTS | CA | 0 | 0 | 0 | 0 | 0 | 0 | 0 | 0 | 0 | 0 | 0 | 0 | 0 | 0 | 0 | 0 | 0 | 0 | 0 |
| CRESTLINE | CA | 0 | 0 | 0 | 0 | 0 | 0 | 0 | 0 | 0 | 0 | 0 | 0 | 0 | 0 | 0 | 0 | 0 | 0 | 0 |
| DIAMONDBAR | CA | 0 | 0 | 0 | 0 | 0 | 0 | 0 | 0 | 0 | 0 | 0 | 0 | 0 | 0 | 0 | 0 | 0 | 0 | 0 |
| DOS PALOS | CA | 0 | 0 | 0 | 0 | 0 | 0 | 0 | 0 | 0 | 0 | 0 | 0 | 0 | 0 | 0 | 0 | 0 | 0 | 0 |
| ETIWANDA | CA | 0 | 0 | 0 | 0 | 0 | 0 | 0 | 0 | 0 | 0 | 0 | 0 | 0 | 0 | 0 | 0 | 0 | 0 | 0 |
| FARMINGTON | CA | 0 | 0 | 0 | 0 | 0 | 0 | 0 | 0 | 0 | 0 | 0 | 0 | 0 | 0 | 0 | 0 | 0 | 0 | 0 |
| LINDEN | CA | 0 | 0 | 0 | 0 | 0 | 0 | 0 | 0 | 0 | 0 | 0 | 0 | 0 | 0 | 0 | 0 | 0 | 0 | 0 |
| MANTECA | CA | 0 | 0 | 0 | 0 | 0 | 0 | 0 | 0 | 0 | 0 | 0 | 0 | 0 | 0 | 0 | 0 | 0 | 0 | 0 |
| MARSHALL | CA | 0 | 0 | 0 | 0 | 0 | 0 | 0 | 0 | 0 | 0 | 0 | 0 | 0 | 0 | 0 | 0 | 0 | 0 | 0 |
| MENTONE | CA | 0 | 0 | 0 | 0 | 0 | 0 | 0 | 0 | 0 | 0 | 0 | 0 | 0 | 0 | 0 | 0 | 0 | 0 | 0 |
| NOVATIO | CA | 0 | 0 | 0 | 0 | 0 | 0 | 0 | 0 | 0 | 0 | 0 | 0 | 0 | 0 | 0 | 0 | 0 | 0 | 0 |
| ONTARIO | CA | 0 | 0 | 0 | 0 | 0 | 0 | 0 | 0 | 0 | 0 | 0 | 0 | 0 | 0 | 0 | 0 | 0 | 0 | 0 |
| POMANO | CA | 0 | 0 | 0 | 0 | 0 | 0 | 0 | 0 | 0 | 0 | 0 | 0 | 0 | 0 | 0 | 0 | 0 | 0 | 0 |
| REDLANDS | CA | 0 | 0 | 0 | 0 | 0 | 0 | 0 | 0 | 0 | 0 | 0 | 0 | 0 | 0 | 0 | 0 | 0 | 0 | 0 |
| RIPON | CA | 0 | 0 | 0 | 0 | 0 | 0 | 0 | 0 | 0 | 0 | 0 | 0 | 0 | 0 | 0 | 0 | 0 | 0 | 0 |
| RUNNINGSPG | CA | 0 | 0 | 0 | 0 | 0 | 0 | 0 | 0 | 0 | 0 | 0 | 0 | 0 | 0 | 0 | 0 | 0 | 0 | 0 |
| S BERNDINO | CA | 0 | 0 | 0 | 0 | 0 | 0 | 0 | 0 | 0 | 0 | 0 | 0 | 0 | 0 | 0 | 0 | 0 | 0 | 0 |
| SNELLING | CA | 0 | 0 | 0 | 0 | 0 | 0 | 0 | 0 | 0 | 0 | 0 | 0 | 0 | 0 | 0 | 0 | 0 | 0 | 0 |
| UPLAND | CA | 0 | 0 | 0 | 0 | 0 | 0 | 0 | 0 | 0 | 0 | 0 | 0 | 0 | 0 | 0 | 0 | 0 | 0 | 0 |

1102
1104

[ Return to Input Parameters ]   [ Help ]   [ Close ]

Twelve Month Forecast

Forecasting Month: 01/2008
OCN: ALL | RC: ALL | RC State: CA | NPA: 209 415 909

| Rate Area | NPA(s) | M1 | M2 | M3 | M4 | M5 | M6 | M7 | M8 | M9 | M10 | M11 | M12 |
|---|---|---|---|---|---|---|---|---|---|---|---|---|---|
| ARROWHEAD | 209 | 0 | 0 | 0 | 0 | 0 | 0 | 0 | 0 | 0 | 0 | 0 | 0 |
| BIGBEAR CY | 209 | 0 | 0 | 0 | 0 | 0 | 0 | 0 | 0 | 0 | 0 | 0 | 0 |
| BIGBEAR LK | 209 | 0 | 0 | 0 | 0 | 0 | 0 | 0 | 0 | 0 | 0 | 0 | 0 |
| CALIMESA | 209 | 0 | 0 | 0 | 0 | 0 | 0 | 0 | 0 | 0 | 0 | 0 | 0 |
| CHINO | 209 | 0 | 0 | 0 | 0 | 0 | 0 | 0 | 0 | 0 | 0 | 0 | 0 |
| CLAREMONT | 209 | 0 | 0 | 0 | 0 | 0 | 0 | 0 | 0 | 0 | 0 | 0 | 0 |
| CLEMENTS | 209 | 0 | 0 | 0 | 0 | 0 | 0 | 0 | 0 | 0 | 0 | 0 | 0 |
| CRESTLINE | 209 | 0 | 0 | 0 | 0 | 0 | 0 | 0 | 0 | 0 | 0 | 0 | 0 |
| DIAMONDBAR | 209 | 0 | 0 | 0 | 0 | 0 | 0 | 0 | 0 | 0 | 0 | 0 | 0 |
| DOS PALOS | 209 | 0 | 0 | 0 | 0 | 0 | 0 | 0 | 0 | 0 | 0 | 0 | 0 |
| ETIWANDA | 209 | 0 | 0 | 0 | 0 | 0 | 0 | 0 | 0 | 0 | 0 | 0 | 0 |
| FARMINGTON | 209 | 0 | 0 | 0 | 0 | 0 | 0 | 0 | 0 | 0 | 0 | 0 | 0 |
| LINDEN | 209 | 0 | 0 | 0 | 0 | 0 | 0 | 0 | 0 | 0 | 0 | 0 | 0 |
| MANTECA | 209 | 0 | 0 | 0 | 0 | 0 | 0 | 0 | 0 | 0 | 0 | 0 | 0 |
| MARSHALL | 209 | 0 | 0 | 0 | 0 | 0 | 0 | 0 | 0 | 0 | 0 | 0 | 0 |
| MENTONE | 209 | 0 | 0 | 0 | 0 | 0 | 0 | 0 | 0 | 0 | 0 | 0 | 0 |
| NOVATIO | 209 | 0 | 0 | 0 | 0 | 0 | 0 | 0 | 0 | 0 | 0 | 0 | 0 |
| ONTARIO | 209 | 0 | 0 | 0 | 0 | 0 | 0 | 0 | 0 | 0 | 0 | 0 | 0 |
| POMANO | 209 | 0 | 0 | 0 | 0 | 0 | 0 | 0 | 0 | 0 | 0 | 0 | 0 |
| REDLANDS | 209 | 0 | 0 | 0 | 0 | 0 | 0 | 0 | 0 | 0 | 0 | 0 | 0 |
| RIPON | 209 | 0 | 0 | 0 | 0 | 0 | 0 | 0 | 0 | 0 | 0 | 0 | 0 |
| RUNNINGSPG | 209 | 0 | 0 | 0 | 0 | 0 | 0 | 0 | 0 | 0 | 0 | 0 | 0 |
| S BERNDINO | 209 | 0 | 0 | 0 | 0 | 0 | 0 | 0 | 0 | 0 | 0 | 0 | 0 |
| SNELLING | 209 | 0 | 0 | 0 | 0 | 0 | 0 | 0 | 0 | 0 | 0 | 0 | 0 |
| UPLAND | 209 | 0 | 0 | 0 | 0 | 0 | 0 | 0 | 0 | 0 | 0 | 0 | 0 |

1202, 1204

[ Return to Input Parameters ] [ Help ] [ Close ] [ Export Data ]

FIGURE 12

Jeopardy Analysis – Rate Center View

Month: 01/2008 | OCN: ALL | RC: ALL | RC State: CA | Site/WC: ALL | Site/WC State: ALL | CLLI: ALL | Sort by: EXH | TN
TYPE: ALL

[First][Prev] Page 1 of 10 [Next][Last] Go to Page 1 ▼

| RC | RC_ST | CLLI EXH | RC EXH | TOT | UNAV | AVAIL | %AVAIL | MTE | MTE THR | %UTIL | UTIL THR | ELIG |
|---|---|---|---|---|---|---|---|---|---|---|---|---|
| HEMT SNJC | CA | 3 | 3 | 18,000 | 17,817 | 183 | 1 | 3.20 | 6 | 87.97 | 75 | X |
| VTYL HSPR | CA | 23 | 23 | 50,000 | 46,499 | 3,501 | 7 | 15.00 | 6 | 85.52 | 75 | |
| LSAN DA 07 | CA | 27 | 27 | 30,000 | 29,356 | 644 | 2 | 18.90 | 6 | 97.22 | 75 | |
| EAGLE MT | CA | 30 | 30 | 1,000 | 2625 | 735 | 74 | 36.80 | 6 | 25.70 | 75 | |
| MAD RIVER | CA | 44 | 44 | 1,000 | 634 | 366 | 37 | 36.60 | 6 | 61.00 | 75 | |
| BANNING | CA | 5 | 49 | 38,999 | 37,282 | 1,717 | 4 | 16.70 | 6 | 90.32 | 75 | |
| LAKEVIEWNU | CA | 54 | 54 | 9,000 | 8,041 | 959 | 11 | 63.90 | 6 | 82.00 | 75 | |
| CALIMESA | CA | 38 | 59 | 33,000 | 28,026 | 4,974 | 15 | 62.20 | 6 | 78.36 | 75 | |
| REEDLEY | CA | 59 | 59 | 23,000 | 19,600 | 3,400 | 15 | 100.00 | 6 | 80.23 | 75 | |
| VTVL APVY | CA | 15 | 65 | 45,000 | 36,873 | 8,127 | 18 | 52.10 | 6 | 75.88 | 75 | |
| VTVL APLN | CA | 67 | 67 | 15,000 | 13,907 | 1,093 | 7 | 19.90 | 6 | 83.42 | 75 | |
| CHINO | CA | 68 | 68 | 8,000 | 5,780 | 2,220 | 28 | 46.20 | 6 | 64.96 | 75 | |
| NEWBURYPRK | CA | 54 | 72 | 136,000 | 127,230 | 8,770 | 6 | 274.10 | 6 | 88.22 | 75 | |
| ALAMITOS | CA | 68 | 82 | 62,000 | 52,928 | 9,072 | 15 | 54.30 | 6 | 82.65 | 75 | |
| ALPAUGH | CA | 85 | 85 | 257,000 | 182,901 | 74,099 | 29 | 999.90 | 6 | 67.22 | 75 | |
| ALPINE | CA | 85 | 85 | 1,000 | 330 | 670 | 67 | 999.90 | 6 | 29.50 | 75 | |
| ARROWHEAD | CA | 85 | 85 | 3,000 | 846 | 2,154 | 72 | 999.90 | 6 | 26.67 | 75 | |
| AZUSA | CA | 85 | 85 | 20,000 | 15,164 | 4,836 | 24 | 999.90 | 6 | 71.47 | 75 | |
| BADGER | CA | 85 | 85 | 93,000 | 67,987 | 25,013 | 27 | 999.90 | 6 | 68.56 | 75 | |
| | CA | 85 | 85 | 2,000 | 278 | 1,722 | 86 | 999.90 | 6 | 12.25 | 75 | |

[Return to Input Parameters] [Help] [Close] [Export Data]

K-Block Request Part 1A

1.0 General Information

1.2 Section
- NPA: 212 — 1602
- OCN: 9104
- Number of K-Blocks requested: 1 — 1604
- Switching Identification (CLLI): NYCMNYBSDSO — 1606
- Site/WC: BROAD STREET
- Rate Center: NWYRCYZN01 — 1608
- Route same as NPA
- NXXX

1.3 Dates
- Date of Application: 01/20/2006 — 1610
- Requested Effective Date: MM 1 DD 17 YYYY 2006
- Requested Expedited Treatment — 1612

1.4 Type of Company Requesting
- Type of Service: Wireline
- K-Block Assignment preference
- K-Blocks that are undesirable for this assignment, if any:

K-Block Request – Appendix 3

Date: 01/20,2006 | OCN: ALL | Rate Center: NWYRCYZN01 | RC State: NY | NPA: ALL | CLLI: ALL Filter by
NPANXXS included in the growth
calculation: 6349   [Details]
TNS available for assignment: 840532

1602

Previous 6 Month Growth History

| 6 | 5 | 4 | 3 | 2 | 1 |
|---|---|---|---|---|---|
| -27 | 26587 | -23115 | -21134 | 11229 | 5720 |

← 1614

Projected 12 Month Incremental Demand

| 1 | 2 | 3 | 4 | 5 | 6 |
|---|---|---|---|---|---|
| -31641 | 21619 | 15487 | 23561 | 26012 | 17654 |
| 7 | 8 | 9 | 10 | 11 | 12 |
| 19818 | 24103 | 23564 | 23663 | 7966 | 23080 |

← 1616

Average Growth Rate: 12165

Explanation

Months to Exhaust: 69.1    ← 1618
Threshold Months to Exhaust: 6    [Recalculate Months to Exhaust]
Utilization Level: 77.08%    Utilization Threshold: 75%

[See Overrides Used]

[Help]  [Review Form]  [Reset]                    [<<Back]  [Save>>]

Rating Code

- •0001 — Multiples of 1000, excluding 0000.
- •0002 — Multiples of 100, excluding 0000.
- •0003 — This category includes all good numbers except the ones belonging first two rating codes. Repeating digits including 0000.
- •0005 — Telephone numbers with no pattern.

1802

| Step | Rating Code | # of TN's in a Sequence | Description |
|---|---|---|---|
| 1 | 5 | 0 (Non-Sequential) | TN's with no pattern and not part of a sequence group |
| 2 | 5 | 2-9 | TN's with no pattern and part of sequence group of 2 to 9 |
| 3 | 3 | 0 | All good TN's excluding multiples of 1000 and 100 and not part of a sequence group |
| 4 | 3 | 2-9 | All good TN's excluding multiples of 1000 and 100 and part of a sequence group of 2 to 9 |
| 5 | 5 | <100 | TN's with no pattern and part of sequence group of <100 |
| 6 | 3 | <100 | Good TN's which are part of sequence group of <100 |
| 7 | Any pattern TN | No Limitation | In this step, the algorithm attempts to give any TN irrespective of the pattern and the sequence group it belongs to |

| File | Edit | View | Tools | TN | Window | Help |

Favorites [ ▼ ] | Popup new window [X]

| Wire Center Profile | TN Range | Centrex/DID Selection | TN Selection-CA77453 | TN Inquiry | Sequence Inquiry |

Search Criteria

NPA [951] NXX [296] From [ ] To [ ] Count >= [ ] Category [ ▼ ] | Go | [Search] [Reserve] [Modify C] [Clear] [Close]

TN Sequence

| NPA | NXX | Start Line | End Line | Count | TN Category | Wire Center Code | Rating Code |
|---|---|---|---|---|---|---|---|
| 951 | 296 | 5295 | 5299 | 5 | POTS | 58 | GOOD NUMBERS |
| 951 | 296 | 5341 | 5345 | 5 | POTS | 58 | GOOD NUMBERS |
| 951 | 296 | 5242 | 5245 | 4 | POTS | 58 | GOOD NUMBERS |
| 951 | 296 | 5606 | 5609 | 4 | DID | 58 | NORMALRS |
| 951 | 296 | 1005 | 1007 | 3 | POTS | 58 | GOOD NUMBERS |
| 951 | 296 | 2995 | 2997 | 3 | POTS | 58 | GOOD NUMBERS |
| 951 | 719 | 1587 | 1589 | 3 | POTS | 58 | GOOD NUMBERS |
| 951 | 719 | 5567 | 5569 | 3 | POTS | 58 | GOOD NUMBERS |
| 951 | 296 | 5563 | 5564 | 2 | POTS | 58 | GOOD NUMBERS |
| 951 | 587 | 1193 | 1194 | 2 | POTS | 58 | GOOD NUMBERS |
| 951 | 308 | 9232 | 9233 | 2 | POTS | 58 | GOOD NUMBERS |
| 951 | 719 | 1487 | 1488 | 2 | POTS | 58 | GOOD NUMBERS |
| 951 | 699 | 9710 | 9711 | 2 | POTS | 58 | GOOD NUMBERS |
| 951 | 308 | 2260 | 2261 | 2 | POTS | 58 | GOOD NUMBERS |
| 951 | 506 | 9721 | 9722 | 2 | POTS | 58 | GOOD NUMBERS |
| 951 | 296 | 1698 | 1699 | 2 | POTS | 58 | GOOD NUMBERS |
| 951 | 296 | 9788 | 9789 | 2 | POTS | 58 | GOOD NUMBERS |
| 951 | 296 | 1153 | 1154 | 2 | POTS | 58 | GOOD NUMBERS |
| 951 | 296 | 9952 | 9953 | 2 | POTS | 58 | GOOD NUMBERS |

← 1960

02/05/2008 5:03 PM EST :: Sequence information retrieved successfully.

FIGURE 19D

METHODS AND SYSTEMS FOR MANAGING AN INVENTORY OF TELEPHONE NUMBERS

BACKGROUND INFORMATION

Some companies that specialize in providing telephone numbers to end users may maintain a large inventory of telephone numbers. These companies may consistently receive requests for new telephone numbers and notifications of end of use of telephone numbers in large amounts on a daily basis. Based on this type of activity, the companies may maintain some methods for selecting telephone numbers and some methods for forecasting telephone numbers. In some instances, however, these methods may not efficiently manage the large inventory of telephone numbers.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIG. 3 illustrates exemplary telephone number forecast reports provided by a telephone number management system in accordance with exemplary embodiments;

FIG. 4 illustrates an exemplary screen display of input parameters in accordance with exemplary embodiments;

FIG. 5 illustrates an exemplary screen display of a telephone number utilization report in accordance with exemplary embodiments;

FIG. 6A illustrates an exemplary screen display of current data hierarchy in accordance with exemplary embodiments;

FIG. 6B illustrates an exemplary screen display of modified data hierarchy in accordance with exemplary embodiments;

FIG. 7 illustrates an exemplary screen display of another telephone number utilization report in accordance with exemplary embodiments;

FIG. 9 illustrates an exemplary screen display of an outward activity report in accordance with exemplary embodiments;

FIG. 10 illustrates an exemplary screen display of a forecast detail report in accordance with exemplary embodiments;

FIG. 11 illustrates an exemplary screen display of a telephone number forecast report at a rate-center view in accordance with exemplary embodiments;

FIG. 12 illustrates an exemplary screen display of a twelve-month forecast report in accordance with exemplary embodiments;

FIG. 13 illustrates an exemplary screen display of a jeopardy analysis report at a rate-center level view in accordance with exemplary embodiments;

FIG. 15 illustrates an exemplary screen display of a K-Block analysis report in accordance with exemplary embodiments;

FIG. 16A illustrates an exemplary screen display of a portion of a K-Block request in accordance with exemplary embodiments;

FIG. 16B illustrates an exemplary screen display of another portion of a K-Block request in accordance with exemplary embodiments;

FIG. 18 illustrates an exemplary telephone number selection algorithm in accordance with exemplary embodiments;

FIG. 19A illustrates an exemplary screen display of a telephone number selection graphical user interface in accordance with exemplary embodiments;

FIG. 19B illustrates another exemplary screen display of a telephone number selection graphical user interface in accordance with exemplary embodiments;

FIG. 19C illustrates yet another exemplary screen display of a telephone number selection graphical user interface in accordance with exemplary embodiments;

FIG. 19D illustrates even further an exemplary screen display of a telephone number selection graphical user interface in accordance with exemplary embodiments;

Figure 1:
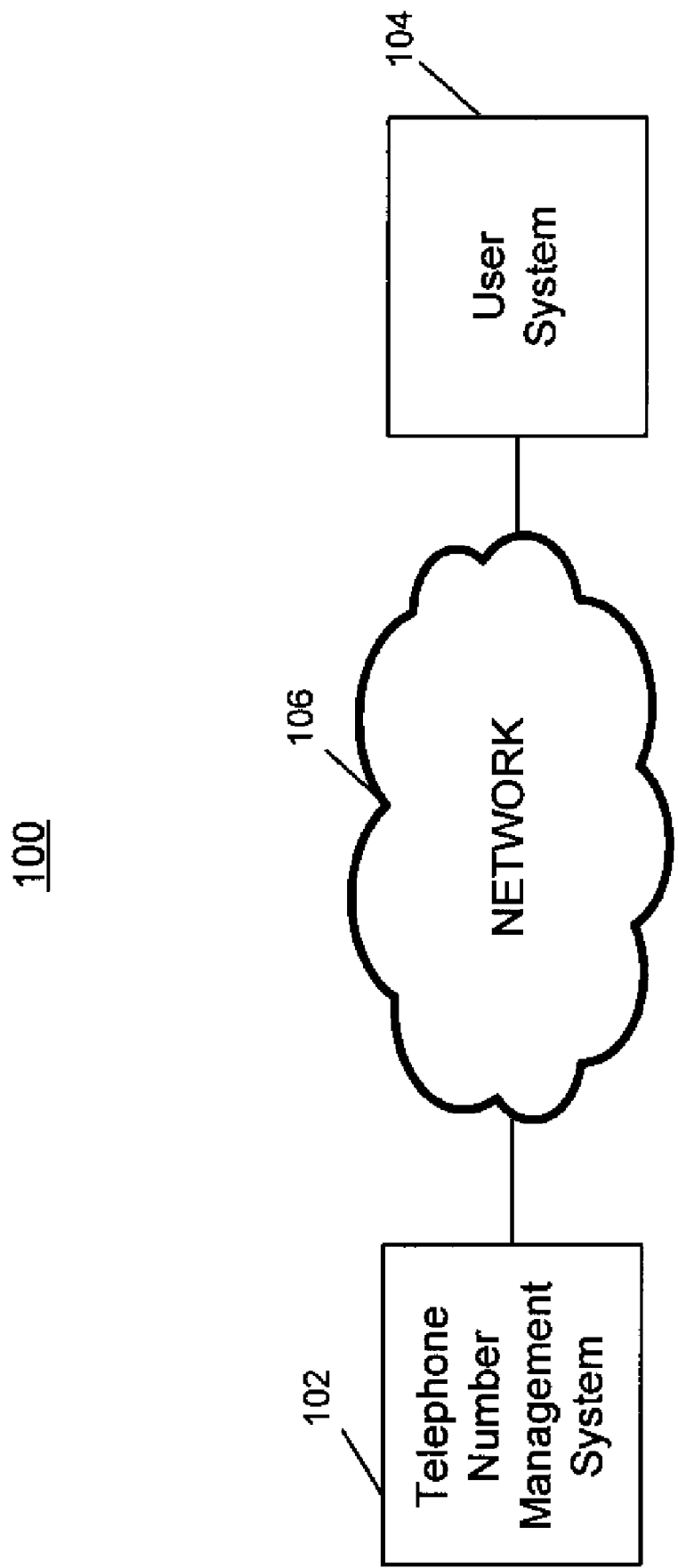
FIG. 1 illustrates a telephone number management system architecture in accordance with exemplary embodiments.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

A telephone management system may be configured to forecast future telephone number usage based on past telephone number usage and/or search for and/or provide a telephone number associated with an inventory of telephone numbers based on various search criteria. In various embodiments, forecasting future telephone number usage may include analyzing past historical trends in telephone number usage. In various embodiments, providing a telephone number associated with an inventory may include first providing one or more telephone numbers that are not associated with a numerical pattern and then providing one or more telephone numbers that are associated with a numerical pattern. In various embodiments, one or more telephone numbers associated with a numerical pattern may be provided upon customer request.

The description below describes telephone number management systems, user systems, and network elements that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., telephone number management systems, user systems, etc.) separately. The functions described as being performed at various components may be performed at other components, and the various components may be combined and/or separated. Other modifications also may be made.

A telephone number management system may be configured to manage an inventory of one or more telephone numbers by managing one or more blocks of one or more telephone numbers. A block of one or more telephone numbers may include a set of a thousand telephone numbers. For example, a 813-978-0 block may begin with a telephone number of 813-978-0000 and may end with a telephone number of 813-978-0999. In another example, a 313-544-1 block may begin with a telephone number of 313-544-1000 and may end with a telephone number of 313-544-1999. In yet another example, a 404-555-7 block may begin with a telephone number of 404-555-7000 and may end with a telephone number of 404-555-7999. In various embodiments, the telephone number management system may be configured to utilize telephone numbers associated with the most contaminated blocks prior to utilizing telephone numbers associated with the least contaminated blocks. A contaminated block may include a block where up to 10% of the telephone numbers associated with the block are assigned to end-users. An uncontaminated block may include a block where less than 10% of the telephone numbers associated with the block are assigned to end-users.

In various embodiments, the telephone number management system may be configured to store telephone number data in a hierarchy. A hierarchy may include an organization of data into parent member-child member relationships where a parent member may represent a consolidation of the children members associated with the parent member. For example, a parent member may include state data (e.g., California, etc.) and may include rate center data (e.g., Alamitos, Palo Alto, etc.) as children members. Accordingly, the telephone number management system may identify a telephone number by an assignment of hierarchy levels associated with the telephone number. For example, a telephone number may be associated with a state level, a rate center level, a numbering plan area ("NPA") level, a NXX level, a K-block level, and/or any other level that may be used to identify a particular telephone number. State level data may include data to identify a particular state (e.g., California, Maryland, etc.). Rate center level data may include data to identify a particular geographic area that distinguishes rate boundaries in which telephone calls may be priced the same. In various embodiments, a state level may include one or more rate center levels. NPA level data may include data to identify a three-digit area code for a particular telephone calling area. For example, the three-digit area code may include a number in the first position that is any number from two (2) to nine (9), a number in the second position that is any number from zero (0) to nine (9), and a number in the third position that is any number from zero (0) to nine (9). In various embodiments, a rate center level may include one or more NPA levels. NXX level data may include data to identify three-digit code associated with an exchange code of a North American Numbering Plan telephone number. A North American Numbering Plan format may include "Area Code"+"Exchange Code"+"Line Number" or NPA-NXX-XXXX. For example, the NXX may include a number in the first position that is any number from two (2) to nine (9), a number in the second position that is any number from zero (0) to nine (9), and a number in the third position that is any number from zero (0) to nine (9). In various embodiments, a NPA level may include one or more NXX levels. K-block level data may include data to identify a particular block. For example, the block 313-544-1 may be associated with the one (1) block of the NPA "313" and NXX "544." In various embodiments, a NXX level may include one or more K-block levels.

Based on design preferences, a company associated with the telephone number management system may maintain, in reserve, a sufficient amount of telephone numbers to service pre-existing customer, as well as, new customers. Accordingly, the telephone number management system may be configured to forecast future telephone number usage by calculating forecasting data that is based on historical trends in inventory data. Inventory data may include a snap shot of available telephone numbers, assigned telephone numbers, negotiated telephone numbers, and/or any other status of a telephone number that indicates inventory data for a given period of time (e.g., daily, weekly, monthly, etc.). An available telephone number may include a telephone number that is not assigned to a customer and is therefore available for selection. An assigned telephone number may include a telephone number that is assigned to a customer and is therefore not available for selection. A negotiated telephone number may include a telephone number that is in the process of being negotiated to be assigned to a customer and is therefore not available for selection. If, for example, the negotiated telephone number is not assigned to a customer after a negotiation process, the negotiated telephone number may become an available telephone number.

The telephone number management system may be associated with one or more customers that are companies with several employees. A company may desire several telephone numbers that are in sequential order to make it easier for employees to memorize telephone numbers associated with other employees. Accordingly, the company may request a block of one-thousand (1,000) telephone numbers that are in sequential order from the implementers of the telephone number management system. For example, the ABC Corporation may reside in Washington D.C. and may have one-thousand (1,000) employees working at the Washington D.C. location. To make contacting employees at the Washington D.C. location more efficient, ABC Corporation may request one-thousand (1,000) telephone numbers associated with the Washington D.C. servicing area that are in sequential order. Accordingly, the implementers of the telephone number management system may search for and/or provide the ABC Corporation with a block of telephone numbers (e.g., the 202-555-1 block, 202-555-7 block, 202-955-3 block, etc.) that are associated with the Washington D.C. servicing area.

In various embodiments, the telephone number management system may be configured to select one or more telephone numbers for a customer from an inventory of one or more telephone numbers. The telephone number management system may select a telephone number by searching for a telephone number in various search phases. A search phase may employ one or more search rules that may define how a search may be run. For example, a first phase may include searching for available telephone numbers associated with particular geographic areas, such as, a target switch area and/or a target terminating traffic area/area central office. An area central office (ACO) may include a geographic area that is served by a wire center that is associated with a particular exchange area and/or rate center area. A target switch area may include a particular geographical area associated with a particular switching unit of a telephone company by means of which communication between exchange telephone lines may be established. A target terminating traffic/ACO area may include a particular geographical area served by a wire center that may be within a particular rate center area which identifies a set of addresses. A wire center may include a geographical area that includes all customers whose telephone service may be provided by the same central switching office. The telephone number management system may also apply various search criteria in each phase. A search criteria may include one or more steps to be followed when searching for a particular telephone number.

FIG. 1 illustrates a telephone number management system architecture 100 in accordance with exemplary embodiments. The telephone number management system 102 may be communicatively coupled to one or more user systems 104 via one or more networks 106. A user system 104 may be associated with a user of the telephone number management system 102, such as, an employee of a telephone company implementing the telephone number management system 102. It should be noted that the phrase "user" is used to refer to an entity and/or individual that may access and/or use the telephone number management system 102. Thus users may include employees of telephone companies that are responsible for providing telephone numbers.

The network 106 may include an analog telephone network, a digital telephone network, a cellular telephone network, a public wide area network ("WAN"), such as the Internet, or, different connections, such as combinations of public and private WANs, local areas networks ("LANs"), wireless LANs, encrypted networks, body area networks, or other wired or wireless networks. In an exemplary embodiment, the network 106 may include one or more networks operating as a stand-alone network or in cooperation with each other. Use of the term network herein is not intended to limit the network to a single network.

The telephone number management system 102 may receive request messages, input parameters, and/or any other input data from a user system 104. The request messages may include request data associated with a user requesting a forecast of telephone number usage for a given period of time. A forecast of telephone number usage may include an estimation of the amount of available telephone numbers, unavailable telephone numbers, and/or negotiated telephone numbers for a period of time in the future. Input parameters may include parameters that may be used by the telephone number management system 102 to provide the telephone number forecast and/or telephone number utilization data.

For example, input parameters may include time interval information, level of expansion information, and/or filter information. Time interval information may include information associated with a past time interval (e.g., January, 2007, etc.), current time interval (March, 2008, etc.) and/or future time interval (e.g., June, 2009). Level of expansion information may include information associated with the levels a user may desire to view. For example, a user may desire to view the state level, rate center level, and NPA level. Accordingly, the user may submit input parameters associated with these levels. Filter information may include information associated with limiting the data returned from a query based on user preferences. For example, a user may desire to view only the "455" NPA of the state of California. Accordingly, the user may input "California" as the state level and "455" as the NPA level.

The request messages may include request data associated with a user requesting one or more telephone numbers from the telephone number management system 102 for a customer. In an exemplary embodiment, request data may include a unique customer identification number information associated with a specific type of telephone number desired by the customer, a customer address, and/or any other information that may be used to process a request for one or more telephone numbers. For example, a customer may desire to have a telephone number that spells out "CALL ME," such as, 555-CAL-LMEE. Accordingly, a user may input the specific type of telephone desired information. Based on the request messages, input parameters, and/or input data, the telephone number management system 102 may create, access, and/or store one or more records associated with a database of the telephone number management system 102.

In an exemplary embodiment, the telephone number management system 102 may receive a request from a user system 104 for one or more telephone numbers. The telephone number management system 102 may also receive customer address data from the user system 104. Based on this request and the customer address data, the telephone number management system 102 may access one or more databases and/or search for an available telephone number by employing various search techniques described in further detail below. If, for example, a customer has requested a specific telephone number (e.g., 555-CAL-LMEE, etc.), the telephone number management system 102 may search for and assign the specific number to the customer if the telephone number is available. If, however, a customer has not requested a specific telephone number, the telephone number management system 102 may employ one or more search phases and/or one or more search criteria (described in further detail below) to locate an available telephone number.

In exemplary embodiments, the telephone number management system architecture 100 may include a telephone number management system 102 communicatively coupled to a network 106 and one or more user systems 104 communicatively coupled to the network 106. The network 106 may communicate request messages, input parameters, and/or any other input data from the user system 104 to the telephone number management system 102. The network 106 may allow one or more user systems 104 to access telephone number forecast data and/or telephone number selection data associated with and/or generated by the telephone number management system 102.

In an exemplary embodiment, a customer associated with the telephone number management system 102 may communicate request data via a customer service representative (not shown) associated with the telephone number management system 102. The customer service representative may input request data into the telephone number management system 102 via a user system 104.

In an exemplary embodiment, the user system 104 may be a hardware device that may communicate request messages, input parameters, and/or any other input data to the network 106, may cause access of telephone number forecast data, telephone number utilization data, and/or telephone number selection data using the network 106, and may receive messages from the network 106. The user system 104 may include, but is not limited to, a computer device, a communication device, a personal computer (PC), a workstation, a mobile device, a handheld PC, a thin system, a fat system, a network appliance, an Internet browser, a server, or any other communication device capable of transmitting request messages, input parameters, and/or any other input data, accessing telephone number forecast data, telephone number utilization data, and/or telephone number selection data, and/or receiving messages. In an exemplary embodiment, the user system 104 may include an interface to display information received from the telephone number management system 102 over the network 106.

It is noted that the telephone number management system architecture 100 illustrates a simplified view of various components included in a telephone number management system architecture 100, and that other hardware devices and software not depicted may be included in the telephone number management system architecture 100. It is also noted that the telephone number management system architecture 100 illustrates only a single telephone number management system 102, a single network 106, and a single user system 104. It will be appreciated that multiple instances of these devices may be used. The telephone number management system 102 is discussed in further detail below.

Figure 2:
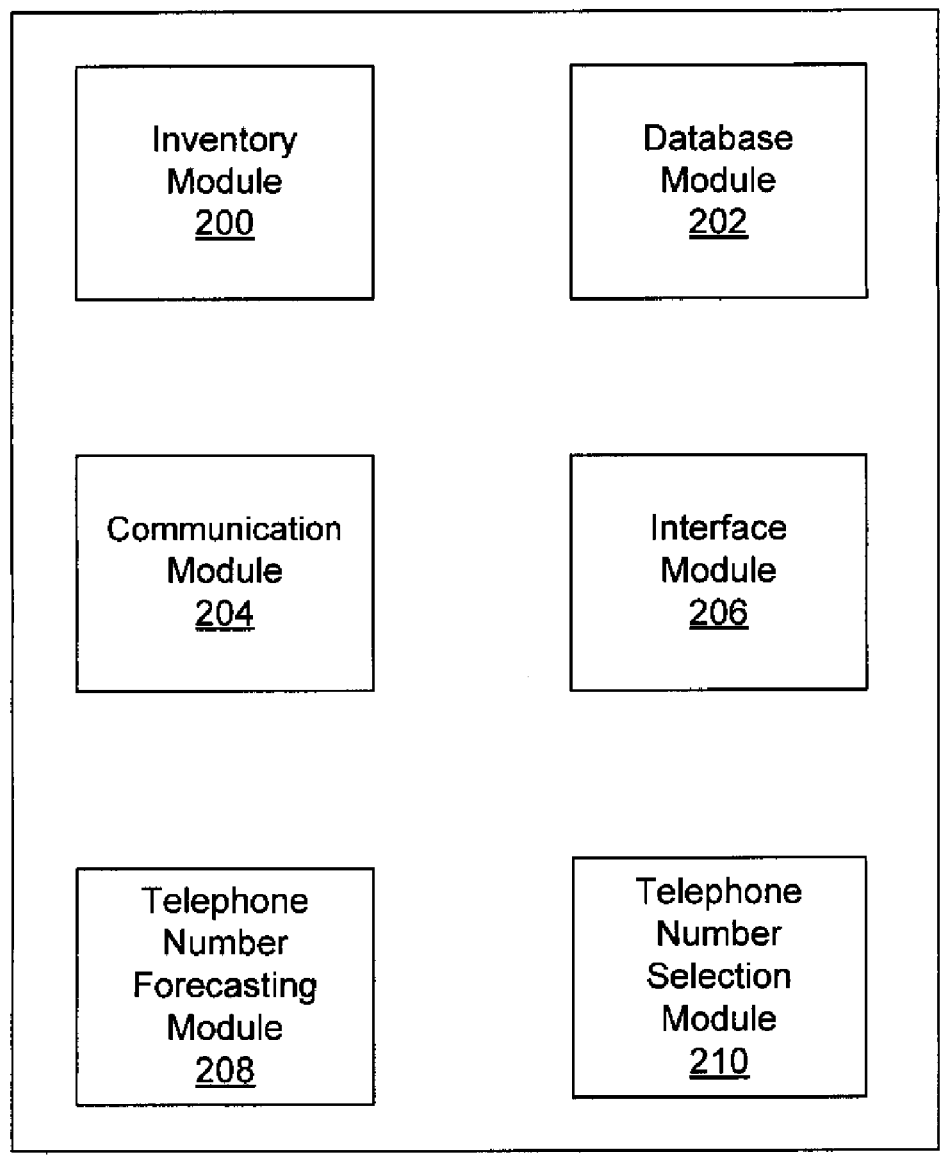
FIG. 2 illustrates exemplary modules of a telephone number management system in accordance with exemplary embodiments.

FIG. 2 illustrates various modules of the telephone number management system 102 in accordance with exemplary embodiments. In an exemplary embodiment, the telephone number management system 102 may include a communication module 204, an inventory module 200, a database module 202, an interface module 206, a telephone number forecasting module 208, and a telephone number selection module 210. It is noted that the modules 200, 202, 204, 206, 208, and 210 are exemplary. The functions of the modules 200, 202, 204, 206, 208, and 210 may be performed at other modules remote or local to the telephone number management system 102, and the modules 200, 202, 204, 206, 208, and 210 may be combined and/or separated.

The communication module 204 may include software and/or hardware operable to receive telephone number management data which may include request messages, input parameters, and/or any other input data from a user system 104 and may communicate the telephone number management data to various modules associated with the telephone number management system 102 using the network 106. The communication module 204 may communicate messages received from the other modules 200, 202, 206, 208, and 210 to the network 106, and may communicate messages to the other modules 200, 202, 204, 206, 208, and 210 received from the network 106.

The database module 202 may include software and/or hardware operable to access and store various information in one or more databases (not shown) associated with the telephone number management system 102. In various embodiments, the one or more databases may include a large storage capacity (e.g., terabytes of data, etc.). The database module 206 may include any device for accessing and storing various information in one or more databases. In various embodiments, one or more databases may store telephone number management data which may include one or more request messages, one or more input parameters, input data, one or more telephone numbers, and/or any other telephone number management data associated with the telephone number management system 102. The telephone number management data may further include request data, input parameter data, inventory data, telephone number usage data, telephone number forecast data, and/or telephone number selection data.

The database module 202 may serve as a gateway from the modules 204, 200, 206, 208, and 210 of the telephone number management system 102 to one or more databases. In one or more embodiments, one or more modules 204, 200, 206, 208, and 210 may access the one or more databases without going through the database module 202.

The inventory module 200 may include software and/or hardware operable to collect, access, and/or store inventory data. Inventory data may include telephone number usage data. For example, inventory data may include a snap shot of the usage status of one or more telephone numbers associated with the telephone number management system 102 for a given period of time (e.g., daily, weekly, monthly, etc.). In various embodiments, inventory data may include a monthly snap shot of the usage status of one or more available telephone numbers, one or more assigned telephone numbers, one or more negotiated telephone numbers, and/or any other usage status of one or more telephone numbers that indicate how and if the telephone numbers are being used. In various embodiments, the inventory module 200 may collect, access, and/or store inventory data for one or more telephone numbers associated with one or more state level areas and/or one or more wire center areas.

The telephone number forecasting module 208 may include software and/or hardware operable to aggregate inventory data to generate telephone number usage forecast data, determine and/or indicate potential jeopardy areas, and/or facilitate requests for additional telephone number inventory. Based on historical trends in inventory data, telephone number forecast module 208 may calculate and/or generate telephone number usage forecast data. Telephone number usage forecast data may include an estimation of the amount of available telephone numbers, unavailable telephone numbers, and/or negotiated telephone numbers for a period of time in the future. For example, for the state of California and NPA of "209," telephone number forecasting module 208 may use historical trends in the amount of unavailable telephone numbers to forecast and/or estimate for a future time interval an amount of unavailable telephone numbers in the same region. Estimation and/or forecasting techniques may include those known in the art. In various embodiments, telephone number forecasting module 208 may be configured to output the telephone number usage forecast data in various reports.

The telephone number forecasting module 208 may be configured to determine and/or indicate potential jeopardy areas. A jeopardy area may include a telephone number servicing area that is close to exhausting an inventory of available telephone numbers that is associated with that particular telephone number servicing area. A telephone number servicing area may include one or more geographical areas associated with a particular inventory of telephone numbers.

Determining potential jeopardy areas may include analyzing inventory data to determine which, if any, telephone number servicing areas are close to exhaustion. Accordingly, telephone number forecasting module 208 may be configured to determine the percentage of telephone number utilization for each telephone number servicing area. Based on the percentage of telephone number utilization, telephone number forecasting module 208 may determine if a particular telephone number servicing area is near exhaustion by comparing the percentage of telephone number utilization to a pre-determined exhaustion threshold. If, for example, the percentage of telephone number utilization is greater than the pre-determined exhaustion threshold, the telephone number forecasting module 208 may determine that the particular telephone number servicing area is close to exhaustion. If, however, the percentage of telephone number utilization is less than the pre-determined exhaustion threshold, the telephone number forecasting module 208 may determine that the particular telephone number servicing area is not close to exhaustion. In various embodiments, the pre-determined exhaustion threshold may be determined by the implementers of the telephone number management system 102 based on various design preferences. The telephone number forecasting module 208 may be configured to output the determination of one or more jeopardy areas in various reports.

The telephone number forecasting module 208 may be configured to facilitate requests for additional telephone number inventory. Based on regulations associated with governmental agencies, a company associated with the telephone number management system 102 may be required to maintain a sufficient amount of telephone numbers to service pre-existing customers, as well as, new customers. Accordingly, telephone number forecasting module 208 may be configured to facilitate requests for additional telephone number inventory by generating various request forms. Based on jeopardy area determinations and/or telephone number usage forecasts, the telephone number forecasting module 208 may output various request forms. The telephone number forecasting module 208 may be configured to transmit one or more completed request forms to one or more governmental agencies using the communication module 204.

The telephone number selection module 210 may include software and/or hardware operable to search for and/or output one or more telephone numbers in response to a customer request. Searching for a telephone number may include performing three search phases. The telephone number selection module 210 may be configured to perform the first search phase by searching for a telephone number that is associated with a particular target switch level. The telephone number selection module 210 may be configured to perform the second search phase by searching for a telephone number that is associated with one or more other switches in the same wire center (e.g., target wire center, etc.) as the target switch. The target wire center may also be associated with the rate center in the second search phase. The telephone number selection module 210 may be configured to perform the third search phase (e.g., rate center search, etc.) by searching one or more other switches associated with the rate center and that are outside of the target wire center.

In various embodiments, the third search phase may be implemented to comply with governmental agency mandates. For example, a governmental agency mandate may include a number resource optimization mandate that may respond to an increasing industry-wide demand for telephone numbering resources and an effort to prevent telephone number service providers from accumulating excessive inventories of telephone numbers and stranding unused telephone numbers. In various embodiments, the number resource optimization mandate may be applicable to telephone number utilization and/or telephone number optimization at the rate center level.

Within each search phase of the telephone number searching process, the telephone number selection module 210 may be configured to search for progressively better quality telephone numbers (e.g., telephone numbers associated with patterns, telephone numbers associated with a sequence, telephone number associated with multiples of one-thousand (1,000) and/or multiples of one-hundred (100), etc.) by executing specific search criteria. For example, the telephone number selection module 210 may be configured to search for and/or retrieve telephone numbers associated with a higher rating code (e.g., line number ending with "000") and telephone numbers in sequence groups (e.g., a group of available telephone numbers associated with an incremental sequence) in the event the supply of normal telephone numbers (e.g., telephone numbers not associated with a defined pattern) is low. A rating code may include a rating that that indicates the quality of a telephone number based on the pattern of the last four digits of a ten digit telephone number. The specific search criteria will be discussed in further detail below.

The telephone number selection module 210 may be configured to support various types of telephone number requests. For example, the telephone number selection module 210 may be configured to support normal telephone number searching, random telephone number searching, good telephone number searching, sequential telephone number searching, wild card telephone number searching, alpha-numeric telephone number searching, and/or any other type of telephone number searching. A good telephone number may include a telephone number that is desirable for most customers. For example, a good telephone number may include a telephone number with repeating digits and/or line number digits that are multiples of one-hundred (100) or one-thousand (1,000). A good telephone number may include a telephone number that is good for a specific customer. For example, a telephone number that is good for a specific customer may include a telephone number with digits that spell part of a customer's personal information, such as, a customer's first name, a customer's last name, a customer's street number, a customer's street name, and/or a customer's social security number.

The telephone number selection module 210 may be configured to search for and/or retrieve an available telephone number and place the retrieved telephone number in locking status during the negotiation process. The telephone number selection module 210 may be configured to keep the locked telephone number in locking status until the locked telephone number is assigned to a customer or released from the negotiation process. Locking the telephone numbers during the negotiation process may ensure that one or more users systems associated with the telephone number management system 102 do not negotiate the same available telephone numbers during the same time period. If, for example, a user system in a negotiation process with a locked telephone number fails to send a release request (e.g., a request for the locked telephone number to go back to available status) for the unassigned locked telephone number, the telephone number selection module 210 may unlock and release the locked telephone number within a pre-determined amount of time.

The telephone number selection module 210 may be configured to search for and/or retrieve available telephone numbers that are associated with the most contaminated K-blocks (e.g., K-blocks associated with the least amount of available telephone numbers). Accordingly, the K-blocks that are associated with the greatest amounts of available telephone numbers may be preserved until the K-blocks that are associated with the least amounts of available telephone numbers are exhausted in accordance with telephone number pooling mandates administered by various governmental agencies.

Telephone number pooling may include a telephone number administration process and/or telephone number assignment process that allocates telephone numbering resources using a shared-industry inventory associated with a particular geographic rate center area. For example, in the United States, K-block telephone number pooling may involve the allocation of K-blocks of sequential telephone numbers within the same NPA/NXX area to different telephone number service providers who serve customers within the same NPA rate center area. All ten thousand telephone numbers associated with a particular NPA/NXX area may continue to be assigned to one rate center area, but may be allocated to one or more telephone number service providers at the K-block level. The telephone numbering resource may be allocated from a shared industry telephone number inventory and may be administered in one or more K-blocks of one thousand telephone numbers for assignment to a telephone number service provider participating in that particular rate center area.

The telephone number selection module 210 may be configured to implement caching techniques to pre-execute various telephone number selection phases and/or steps in anticipation of a user request and store the data in a cache to improve retrieval response times. In various embodiments, these implemented caching techniques may permit the search and/or retrieval of one or more telephone numbers without executing a search algorithm.

The telephone number forecasting module 208 and/or telephone number selection module 210 may transmit a graphical representation of output data to the interface module 206 to enable transmission and subsequent display of the output data to the user via the user system 104.

Interface module 206 may transmit the outputs from the modules associated with the telephone number management system 102 in a form that users associated with the telephone number management system 102 may perceive using, for example, a user system. In various embodiments, the interface module 206 may be a web server to organize and display information viewable on software installed on a user system.

FIG. 3 illustrates exemplary telephone number forecast reports 300 provided by a telephone number management system 102 in accordance with exemplary embodiments. As previously discussed, the telephone number management system 102 may be configured to output telephone number usage forecast data in the format of various reports. Each report listed may be generated by the telephone number management system 102 and outputted to a user via a user system.

For example, telephone number management system 102 may be configured to generate a telephone number utilization report based on various input parameters. A telephone number utilization report may provide a view of telephone number utilization data for various levels, such as, amount of telephone numbers assigned, amount of telephone number unassigned, amount of telephone number available, amount of telephone numbers unavailable, etc. The telephone number utilization report is discussed in further detail below.

Figure 15:
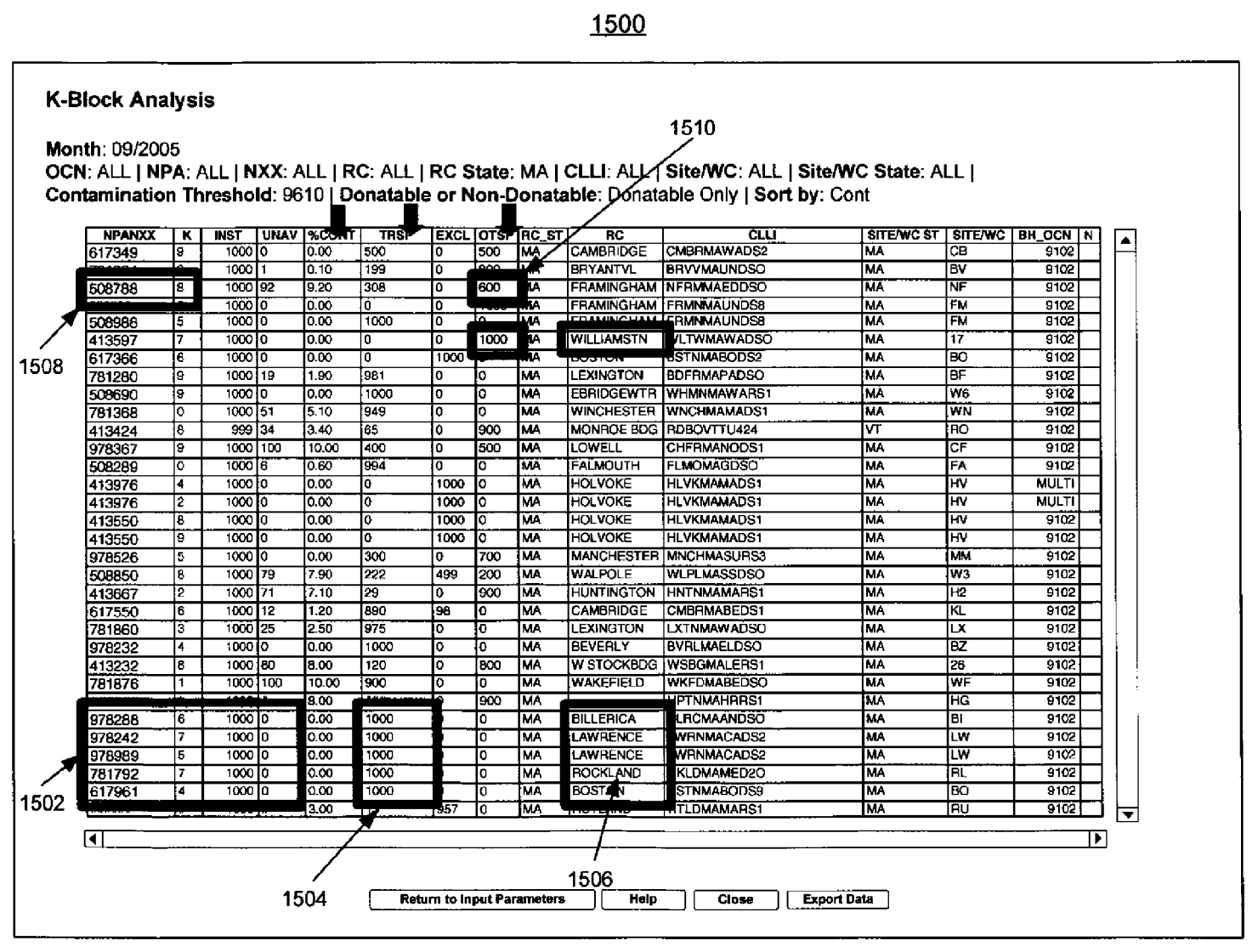

In another example, telephone number management system 102 may be configured to generate and/or output telephone number usage forecast data as depicted in FIG. 15, FIG. 16A, and FIG. 16B. As shown, FIG. 15 illustrates an exemplary screen display of a K-block analysis report 1500 in accordance with exemplary embodiments. In various embodiments, the telephone number management system 102 may be configured to generate and/or output a K-block analysis report 1500 for a user. The K-block analysis report 1500 may provide a view of telephone number usage in various K-blocks. In various embodiments, the K-block analysis report 1500 may be used to determine which, if any, K-blocks are contaminated and/or which, if any, K-blocks are uncontaminated. For example, the K-block analysis report 1500 may indicate that five K-blocks 1502 are not contaminated. Accordingly, the K-block analysis report 1500 may show that none of the telephone numbers associated with these five K-blocks are assigned and/or unavailable by displaying that one-thousand (1,000) telephone numbers are available for each K-block 1504. In various embodiments, the K-block analysis report 1500 may indicate the rate center 1506 of each K-block.

In addition, the K-block analysis report 1500 may indicate that the "508-788-8" K-block 1508 is contaminated. Accordingly, the K-block analysis report 1500 may show that some of the telephone numbers associated with the "508-788-8" K-block are assigned and/or unavailable by displaying that three-hundred eight (308) telephone numbers are available and "600" 1510 telephone numbers are not available.

FIG. 16A illustrates an exemplary screen display of a portion of a K-Block request 1600 in accordance with exemplary embodiments. In various embodiments, the telephone number management system 102 may be configured to generate and/or output a portion of a K-block request form 1600 for a user. The K-block request form 1600 may be used to request additional telephone number resources from various government agencies for areas that are experiencing telephone number resource exhaust. The K-block request form 1600 may be filled out by a user and submitted to the various government agencies using the telephone number management system 102.

In various embodiments, the K-block request form 1600 may display one or more data fields for a user to fill associated with a "NPA" level 1602, a "Number of K-blocks requested" 1604, a "Switching Identification (CLLI)" 1606, and/or a "Rate Center" 1608. In addition, the K-block request form 1600 may display the "Date of Application" 1610 and/or a "Requested Expedited Treatment" button 1612.

FIG. 16B illustrates an exemplary screen display of another portion of a K-Block request 1602 in accordance with exemplary embodiments. In various embodiments, the telephone number management system 102 may be configured to generate and/or output a portion of a K-block request form 1602 for a user. The K-block request form 1602 may be used to provide months to exhaust data (e.g., telephone number forecast usage data, telephone number utilization data, etc.) to various government agencies to request additional K-blocks.

In various embodiments, the K-block request form 1602 may display one or more tables associated with "Previous 6 Month Growth History" 1614 and/or "Projected 12 Month Incremental Demand" 1616 to assist one or more relevant governmental agencies in determining whether to grant a request for additional K-blocks. In addition, the K-block request form 1602 may display a "Threshold Months to Exhaust" of six (6) 1618.

Figure 20:
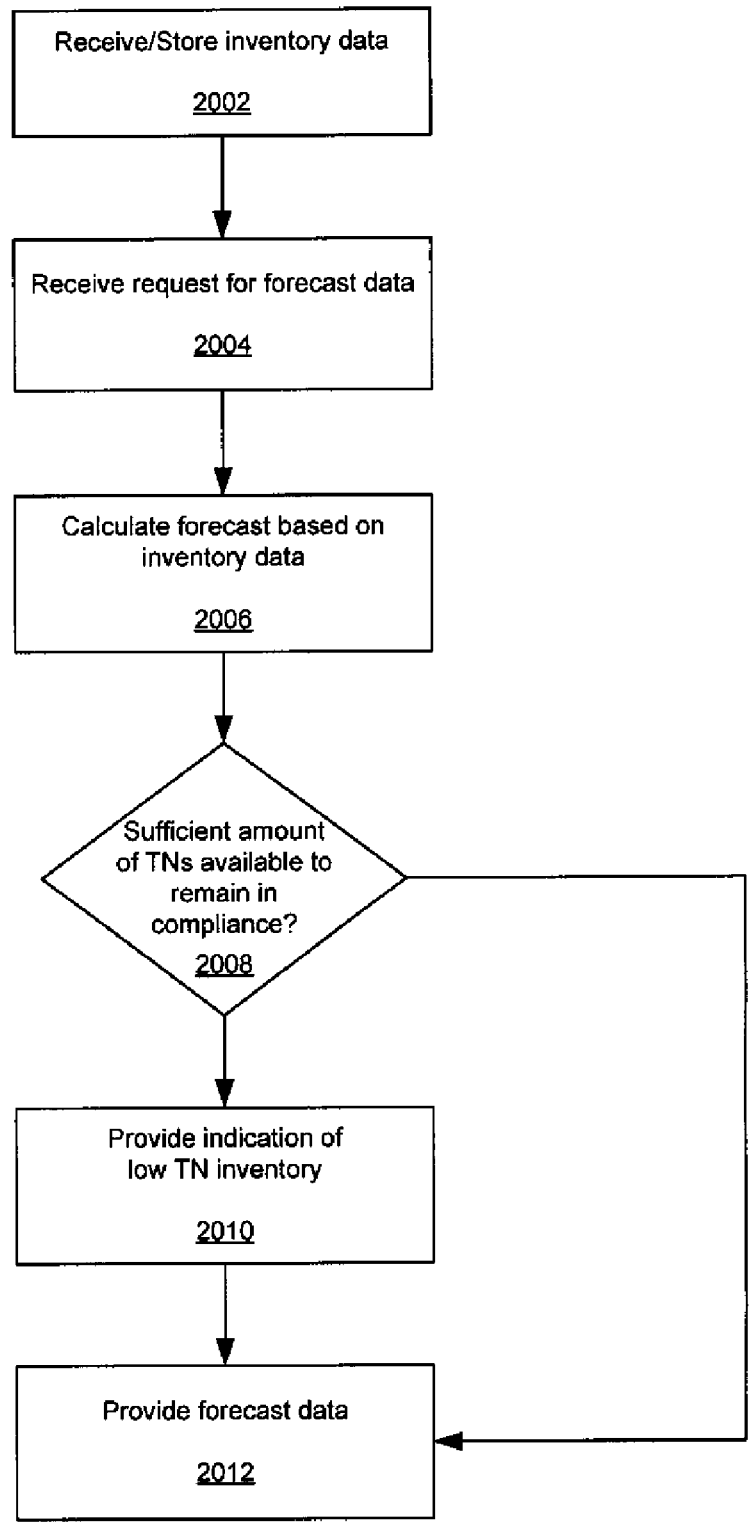
FIG. 20 illustrates a method for managing an inventory of telephone numbers in accordance with exemplary embodiments.

FIG. 20 illustrates a method 2000 for managing an inventory of telephone numbers in accordance with exemplary embodiments. This exemplary method is provided by way of example, as there are a variety of ways to carry out methods disclosed herein. The method 2000 shown in FIG. 20 can be executed or otherwise performed by one or a combination of various systems. The method 2000 is described below as carried out by the telephone number management system 102 shown in FIG. 1 by way of example, and various elements of the telephone number management system 102 are referenced in explaining the example method of FIG. 20. Each block shown in FIG. 20 represents one or more processes, methods, or subroutines carried in the exemplary method 2000. Referring to FIG. 20, the exemplary method 2000 may begin at block 2002.

In block 2002, the method 200 may include an inventory module 200 receiving and/or storing telephone number inventory data. Inventory data may include a snap shot of available telephone numbers, assigned telephone numbers, negotiated telephone numbers, and/or any other status of a telephone number that indicates inventory data. An available telephone number may include a telephone number that is not assigned to a customer and is therefore available for selection. An assigned telephone number may include a telephone number that is assigned to a customer and is therefore not available for selection. A negotiated telephone number may include a telephone number that is in the processing of being negotiated to be assigned to a customer and is therefore not available for selection. If, for example, the negotiated telephone number is not assigned to a customer after a negotiation process, the negotiated telephone number may become an available telephone number. The method 2000 may continue to block 2004.

In block 2004, the method 2000 may include an interface module 206 receiving a request for telephone number usage forecast data from a user system. Telephone number usage forecast data may include an estimation of the amount of available telephone numbers, unavailable telephone numbers, and/or negotiated telephone numbers for a period of time in the future. The method 2000 may continue to block 2006.

In various embodiments, receiving a request for telephone number usage forecast data may be depicted in one or more screen displays as depicted in FIG. 4, FIG. 5, FIG. 6A, FIG. 6B, and FIG. 7. FIG. 4 illustrates an exemplary screen display of input parameters 400 in accordance with exemplary embodiments. After a user has logged into the telephone number management system 102 using a user system, the user may navigate to the screen display of telephone number input parameters 400. As shown, input parameters may include time interval information 402, level of expansion information 404, and/or filter information 406. Using this screen display of input parameters 400, users may be able to input different input parameters, such as, a rate center, a state, a wire center, a switch, a NPA, a NXX, and/or any other input parameter to facilitate filtering.

In various embodiments, the user may submit the input parameters to the telephone number management system 102 to cause the generation and/or output of a telephone number utilization report in real-time and/or at a scheduled time using the "Submit" button 408. The user may schedule the generation and/or output of the telephone number utilization report using the "Schedule" button 410. The user may reset the screen display to clear the input parameters using the "Reset" button 412. The user may arrange the data hierarchy using the "Column Organizer" button 414. The user may request "help" from the telephone number management system 102 using the "Help" button 416. The user may exit out of the telephone number input parameters 400 screen display using the "Close" button 418.

FIG. 5 illustrates an exemplary screen display of a telephone number utilization report 500 in accordance with exemplary embodiments. Based on the input parameters provided by the user, the telephone number management system 102 may generate and/or output a telephone number utilization report 500. By accessing and/or navigating the telephone number utilization report 500, a user may perform the following operations: view the telephone number utilization data, expand the state level to view the telephone number usage data at a rate center level, expand a particular rate center level to view the telephone number usage data at a NPA level, provide the level of expansion input parameter, manipulate the data hierarchy using the column organizer.

In various embodiments, the telephone number utilization report 500 may display the amount of telephone numbers associated with a particular rate center at the state level (e.g., California, etc.) using a chart. For example, the total amount of telephone numbers associated with the California rate center may include "9,158,996" as shown in the "INST" column 502. The telephone number utilization report 500 may display the amount of telephone numbers available in a particular rate center. For example, the amount of telephone numbers available for the California rate center may include "1,867,261" as shown in the "AVAL" column 504. The telephone number utilization report 500 may display the amount of telephone numbers unavailable in a particular rate center. For example, the amount of telephone numbers unavailable for the California rate center may include "7,291,735" as shown in the "UNAV" column 506. The telephone number utilization report 500 may display the amount of time to return the query results (e.g., "2 sec", etc.) using a "Query took" indicator 508. The user may return to the input parameters display, as depicted in FIG. 4, using the "Return to Input Parameters" button 510.

Figures 6A, 6B:
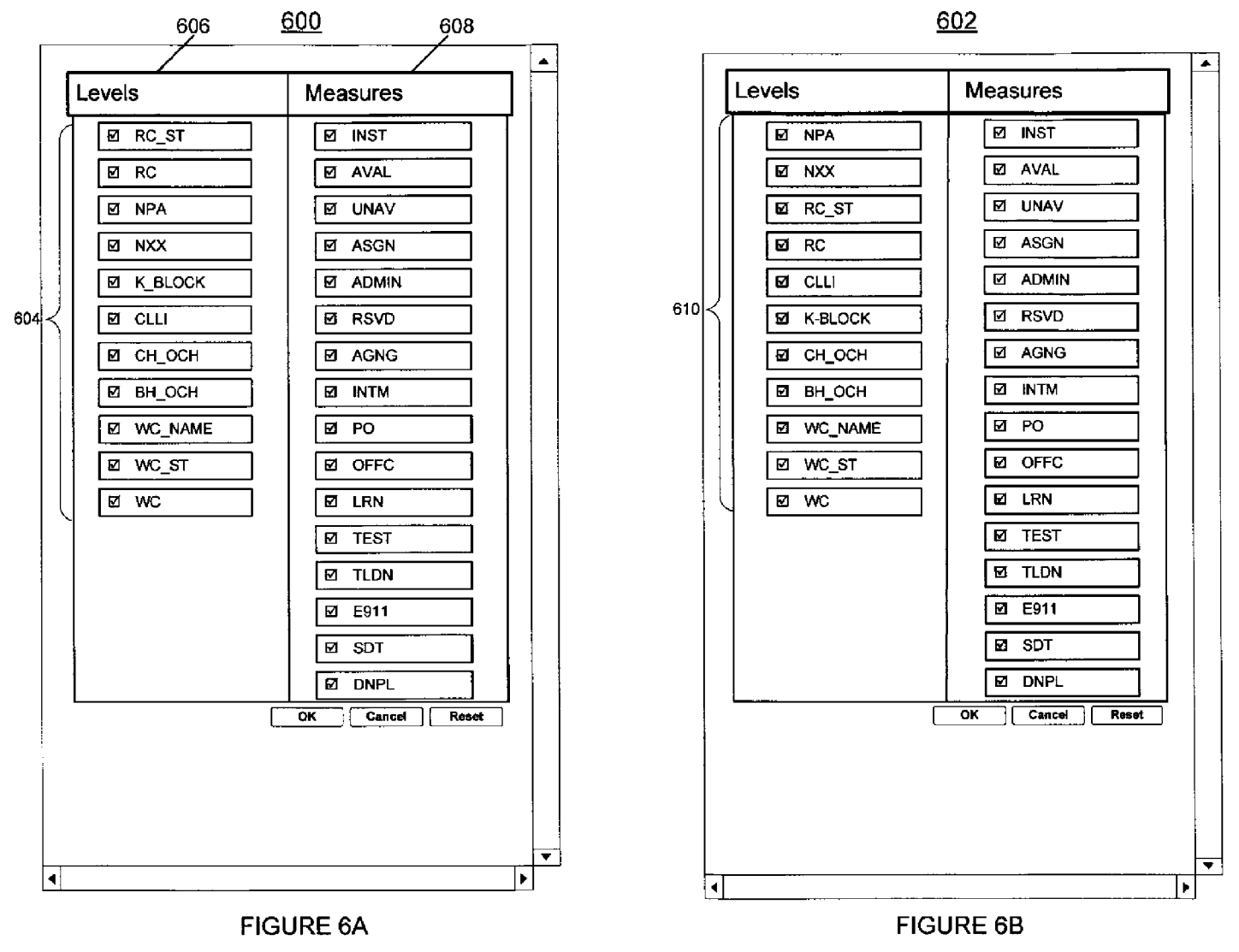

FIG. 6A illustrates an exemplary screen display of current data hierarchy in accordance with exemplary embodiments. As previously discussed, a user may customize the data hierarchy using the column organizer 600. The column organizer 600 may organize data into "Levels" 606 and/or "Measures" 608. Based on the current column organizer 600, the telephone number utilization report may be configured to display data associated with the state level, rate center level, NPA level, NXX level, and/or K-block level since the corresponding buttons 604 have been activated.

In various embodiments, the data hierarchy may be redefined by the user using drag-and-drop operations. In various embodiments, one or more data levels and/or data measures may be removed by un-checking the box next to the unwanted data level and/or unwanted data measure.

FIG. 6B illustrates an exemplary screen display of modified data hierarchy in accordance with exemplary embodiments. Based on the users preferences, the user may modify the data hierarchy. For example, based on the modified column organizer 602, the telephone number utilization report may be configured to display data associated with the NPA level, NXX level, state level, rate center level, and/or switch level in that order since the corresponding levels 610 have been rearranged.

After applying the column organizer settings depicted in FIG. 6B, a telephone number utilization report may be arranged as depicted in FIG. 7. FIG. 7 illustrates an exemplary screen display of a telephone number utilization report 700 in accordance with exemplary embodiments. As previously discussed, based on the users preferences a user may modify the data hierarchy. Accordingly, the telephone number utilization report 700 may be arranged to display the data according to the modified data hierarchy, such as, the NPA level data, the NXX level data, the state level data, the rate center level data, and/or the switch level data in that hierarchy as shown in the "Location" column 702.

In various embodiments, the user may export the hierarchical data view to a spreadsheet using the "Export Data" button 704.

Referring back to FIG. 20 again, in block 2006, the method 2000 may include a telephone number forecasting module 208 calculating one or more telephone number usage forecasts based on the inventory data. In various embodiments, calculating one or more telephone number usage forecasts may include the telephone number forecast module 208 determining a percentage of telephone number utilization for each telephone number servicing area. Based on the percentage of telephone number utilization, telephone number forecast module 208 may determine if a particular telephone number servicing area is near exhaustion by comparing the percentage of telephone number utilization to a pre-determined exhaustion threshold. The method 2000 may continue to block 2008.

Figure 8:
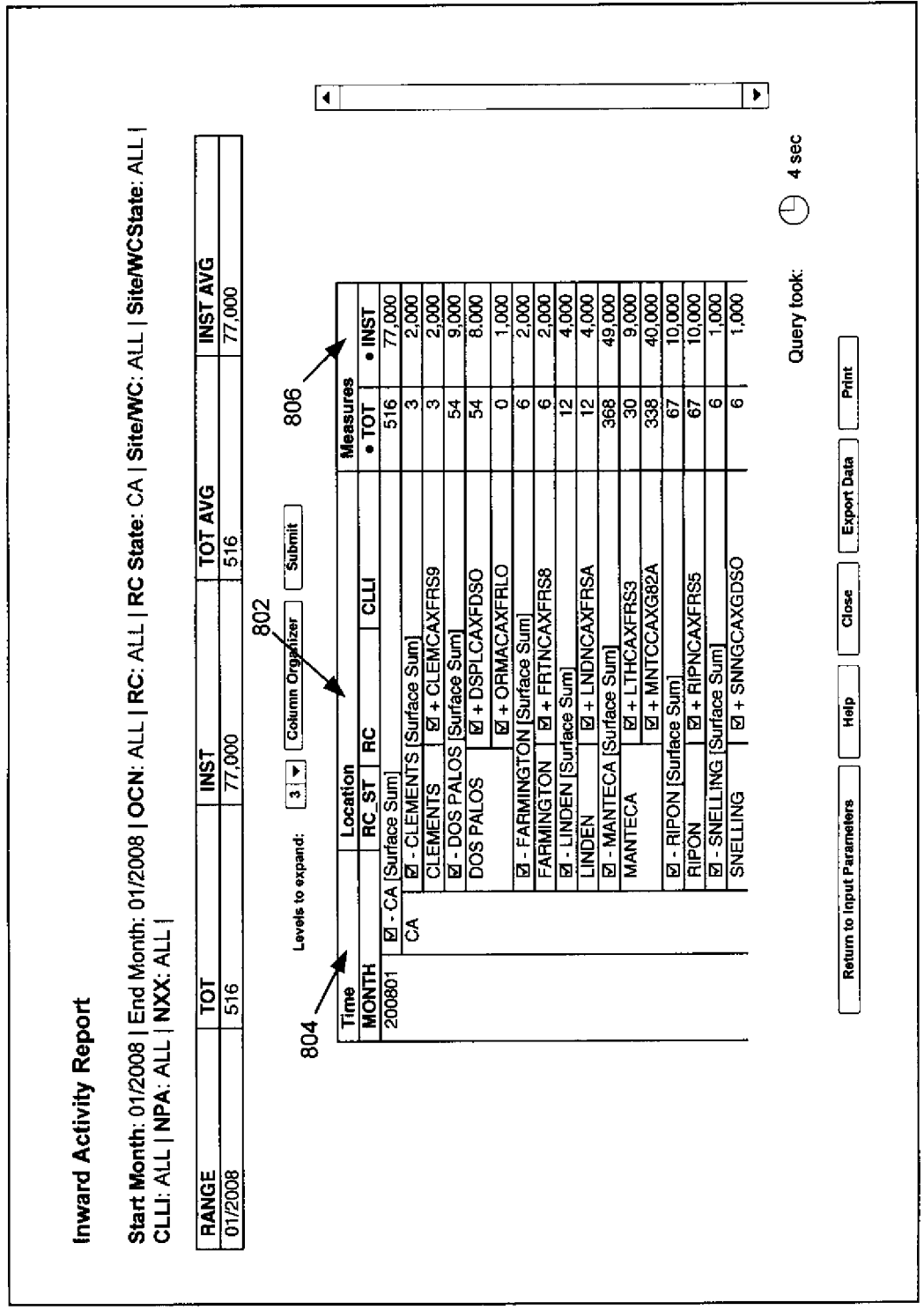
FIG. 8 illustrates an exemplary screen display of an inward activity report in accordance with exemplary embodiments.

In various embodiments, calculating one or more telephone number usage forecasts may include generating and/or outputting telephone number usage forecast data associated with one or more screen displays as depicted in FIG. 8, FIG. 9, FIG. 10, FIG. 11, and FIG. 12. FIG. 8 illustrates an exemplary screen display of an inward activity report 800 in accordance with exemplary embodiments. In various embodiments, the telephone number management system 102 may be configured to generate and/or output an inward activity report 800 for a user. The inward activity report 800 may provide a historical and/or aggregate view of telephone number new connect activity at various levels. The inward activity report 800 may provide the view of telephone number new connect activity at the state level, rate center level, and/or switch levels as shown in the "Location" column 802. The inward activity report 800 may provide the view of telephone number new connect activity associated with a time period, such as, January of 2008 as shown in the "Time" column 804. The inward activity report 800 may provide the view of the total amount of telephone number new connections of five-hundred sixteen (516) and/or total amount of telephone numbers of "77,000" associated with a particular rate center at the state level (e.g., California, etc.) as shown in the "Measures" column 806.

In various embodiments, the inward activity report 800 may be used to track telephone number connection activity growth and/or identify data spikes that may distort telephone number usage forecasts.

FIG. 9 illustrates an exemplary screen display of an outward activity report 900 in accordance with exemplary embodiments. In various embodiments, the telephone number management system 102 may be configured to generate and/or output an outward activity report 900 for a user. The outward activity report 900 may provide a historical and/or aggregate view of telephone number disconnect activity at various levels. The outward activity report 900 may provide the view of telephone number disconnect activity at the state level, rate center level, and/or switch level as shown in the "Location" column 902. The outward activity report 900 may provide the view of telephone number disconnect activity associated with a time period, such as, January of 2008 as shown in the "Time" column 904. The outward activity report 900 may provide the view of the total amount of telephone number disconnections of six-hundred forty-seven (647) and/or total amount of telephone numbers of "77,000" associated with a particular rate center at the state level (e.g., California, etc.) as shown in the "Measures" column 906.

In various embodiments, the outward activity report 900 may be used to for marketing purposes to prevent significant customer loss in various areas. For example, a marketing and/or sales department associated with the telephone number management system 102 may analyze the outward activity data to devise new promotional packages to customers in areas experiencing significant customer loss.

FIG. 10 illustrates an exemplary screen display of a forecast detail report 1000 in accordance with exemplary embodiments. In various embodiments, the telephone number management system 102 may be configured to generate and/or output a forecast detail report 1000 for a user. The forecast detail report 1000 may provide the telephone number usage forecast data associated with a forecast. For example, the telephone number usage forecast data may include an amount of unavailable telephone number, an amount of available telephone numbers, and/or any other telephone number usage data for past time intervals, current time intervals, and/or future time intervals. The telephone number usage forecast data may be used to analyze forecast trends.

In various embodiments, the forecast detail report 1000 may display time periods starting with time periods farthest in the past to time periods farthest in the future as shown in the "Month" column 1002 for a particular telephone number servicing area, such as, the NPA "209" telephone number servicing area. The forecast detail report 1000 may display an amount of unavailable telephone numbers associated with a time period, such as, "57,896" telephone numbers unavailable in February of 2007 as shown in the "UNAV" column 1004. The forecast detail report 1000 may display an amount of available telephone numbers associated with a time period, such as, "19,104" telephone numbers available in February of 2007 as shown in the "AVAL" column 1006. As shown, the forecast detail report 1000 may be based on historical trends in the top-half of the report and may be based on future months forecasted trends in the bottom-half of the report.

FIG. 11 illustrates an exemplary screen display of a telephone number forecast report 1100 at a rate center view in accordance with exemplary embodiments. In various embodiments, the telephone number management system 102 may be configured to generate and/or output a telephone number forecast report 1100 for a user. The telephone number forecast report 1100 may provide a projection, based on historical trends, of how many new K-blocks would be required over the next 5 years to meet customer demand.

The telephone number forecast report 1100 may display a view of rate centers associated with a projection of needed K-blocks in the "RC" column 1104. The telephone number forecast report 1100 may display future time periods associated with a projection of needed K-blocks in the future time period columns 1102.

FIG. 12 illustrates an exemplary screen display of a twelve-month forecast report 1200 in accordance with exemplary embodiments. In various embodiments, the telephone number management system 102 may be configured to generate and/or output a twelve-month forecast report 1200 for a user. The twelve-month forecast report 1200 may provide a month by month one year forecast of expected customer demand for telephone number resources.

The twelve-month forecast report 1200 may display a view of rate centers associated with a twelve-month projection of needed telephone number resources in the "Rate Area" column 1202. The twelve-month forecast report 1200 may display future time periods associated with a twelve-month projection of needed telephone number resources in the future in the future time period columns 1104.

Referring to FIG. 20 again, in block 2008, if the percentage of telephone number utilization is greater than the pre-determined exhaustion threshold, the telephone number forecasting module 208 may determine that the particular telephone number servicing area is close to exhaustion the method 2000 may proceed to block 2010.

In block 2010, the method 200 may include the interface module 206 outputting an indication of the particular telephone number servicing area that is close to exhaustion to the user. The method 2000 may proceed to block 2012.

Figure 14:
FIG. 14 illustrates an exemplary screen display of a jeopardy analysis report at a switch level view in accordance with exemplary embodiments.

In various embodiments, outputting an indication of particular telephone number servicing areas that may be close to exhaustion may include generating and/or outputting one or more jeopardy areas associated with one or more screen displays as depicted in FIG. 13 and FIG. 14. FIG. 13 illustrates an exemplary screen display of a jeopardy analysis report 1300 at a rate center view in accordance with exemplary embodiments. In various embodiments, the telephone number management system 102 may be configured to generate and/or output a jeopardy analysis report 1300 for a user. The jeopardy analysis report 1300 may provide an evaluation of areas that are experiencing an exhaust of telephone number resources at various levels, such as, the rate center level as shown in the "RC" column 1302. For example, the jeopardy analysis report 1300 may identify the areas associated with a particular rate center that are nearest to telephone number exhaust by displaying them in ascending order of remaining months until exhaust as shown in the "MTE" column 1304.

The jeopardy analysis report 1300 may display which particular rate center areas are eligible for requesting additional K-blocks based on the jeopardy analysis data as shown in the "ELIG" column 1306. As shown, the "HEMT SNJC" rate center area may be eligible for requesting additional K-blocks since that particular telephone number servicing area has "3.20" months remaining until exhaust as shown in the "MTE" column 1304.

FIG. 14 illustrates an exemplary screen display of a jeopardy analysis report 1400 at a switch level view in accordance with exemplary embodiments. In various embodiments, the telephone number management system 102 may be configured to generate and/or output a jeopardy analysis report 1400 for a user. The jeopardy analysis report 1400 may provide an evaluation of areas that are experiencing an exhaust of telephone number resources at various levels, such as, the switch level view as shown in the "CLLI" column 1402. For example, the jeopardy analysis report 1400 may identify the areas associated with a particular switch that are nearest to telephone number exhaust by displaying them in ascending order of remaining months until exhaust as shown in the "EXH" column 1404.

Referring to FIG. 20 again, if, however, the percentage of telephone number utilization is less than the pre-determined exhaustion threshold, the telephone number forecasting module 208 may determine that the particular telephone number servicing area is not close to exhaustion and may proceed to block 2012.

In block 2012, the method 200 may include the interface module 206 outputting telephone number usage forecast data to the user. In various embodiments, the telephone number management system 102 may output the telephone number usage forecast data in the form of various reports. The method 2000 may then end.

Figure 21:
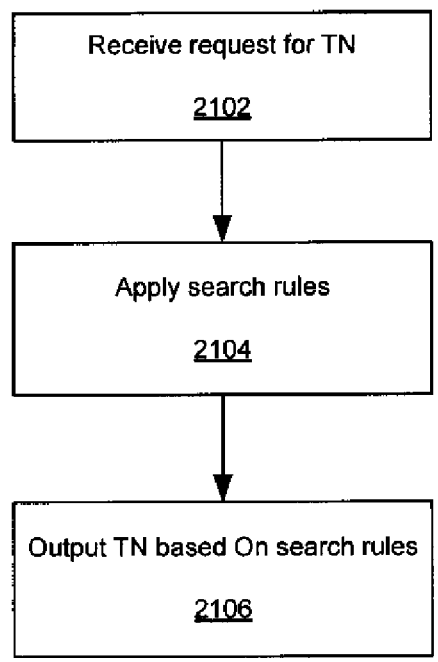
FIG. 21 illustrates a method for selecting a telephone number in accordance with exemplary embodiments.

FIG. 21 illustrates a method 2100 for selecting a telephone number in accordance with exemplary embodiments. This exemplary method is provided by way of example, as there are a variety of ways to carry out methods disclosed herein. The method 2100 shown in FIG. 21 can be executed or otherwise performed by one or a combination of various systems. The method 2100 is described below as carried out by the telephone number management system 102 shown in FIG. 1 by way of example, and various elements of the telephone number management system 102 are referenced in explaining the example method of FIG. 21. Each block shown in FIG. 21 represents one or more processes, methods, or subroutines carried in the exemplary method 2100. Referring to FIG. 21, the exemplary method 2100 may begin at block 2102.

In block 2102, the method 2100 may include an interface module 206 receiving a request for a telephone number from a user one behalf of a customer. In various embodiments, a request for a telephone number may include a unique customer identification number information associated with a specific type of telephone number desired by the customer, a customer address, and/or any other information that may be used to process a request for one or more telephone numbers. The method 2100 may continue to block 2104.

Figure 19A:
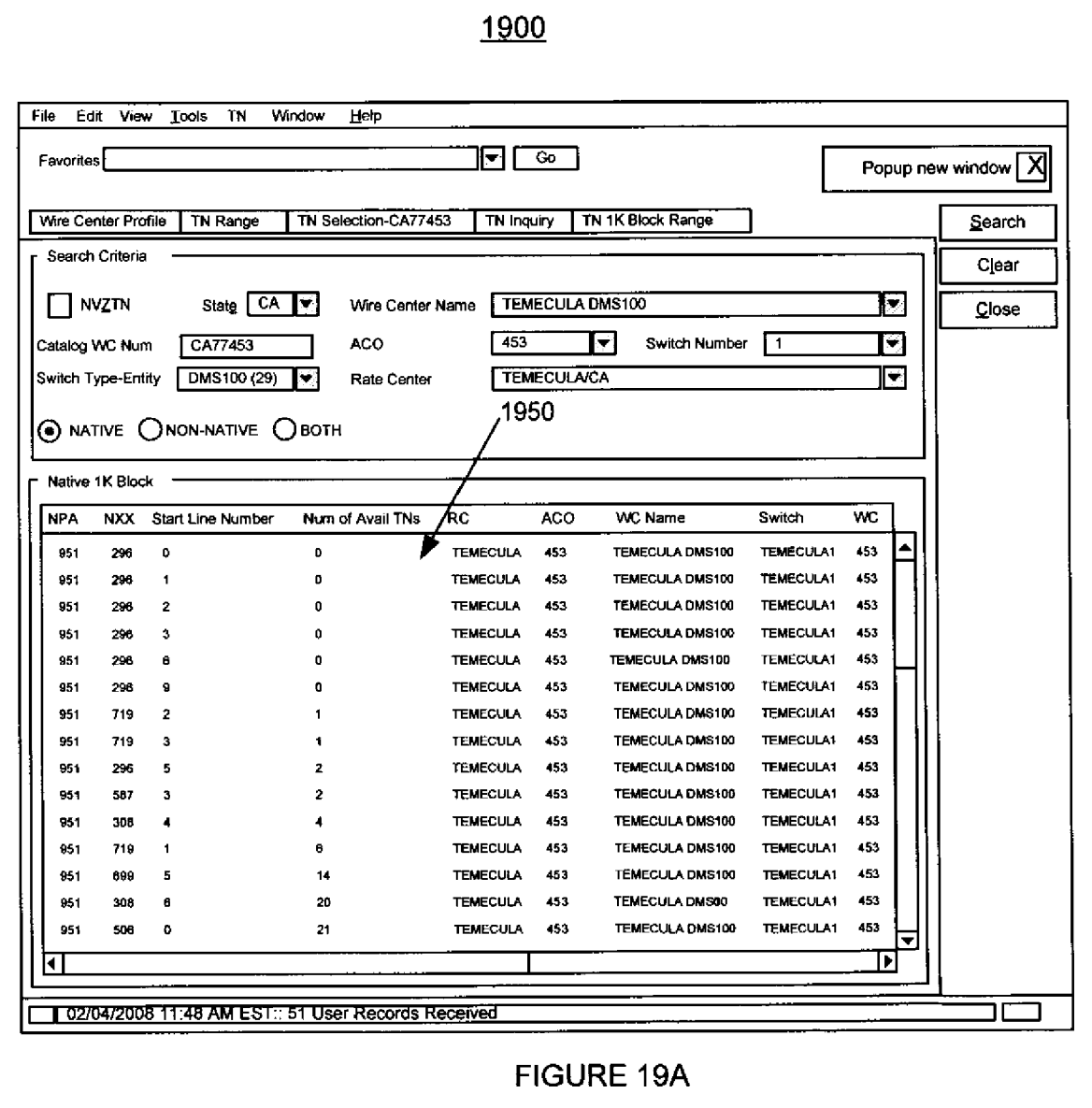
Figure 19B:
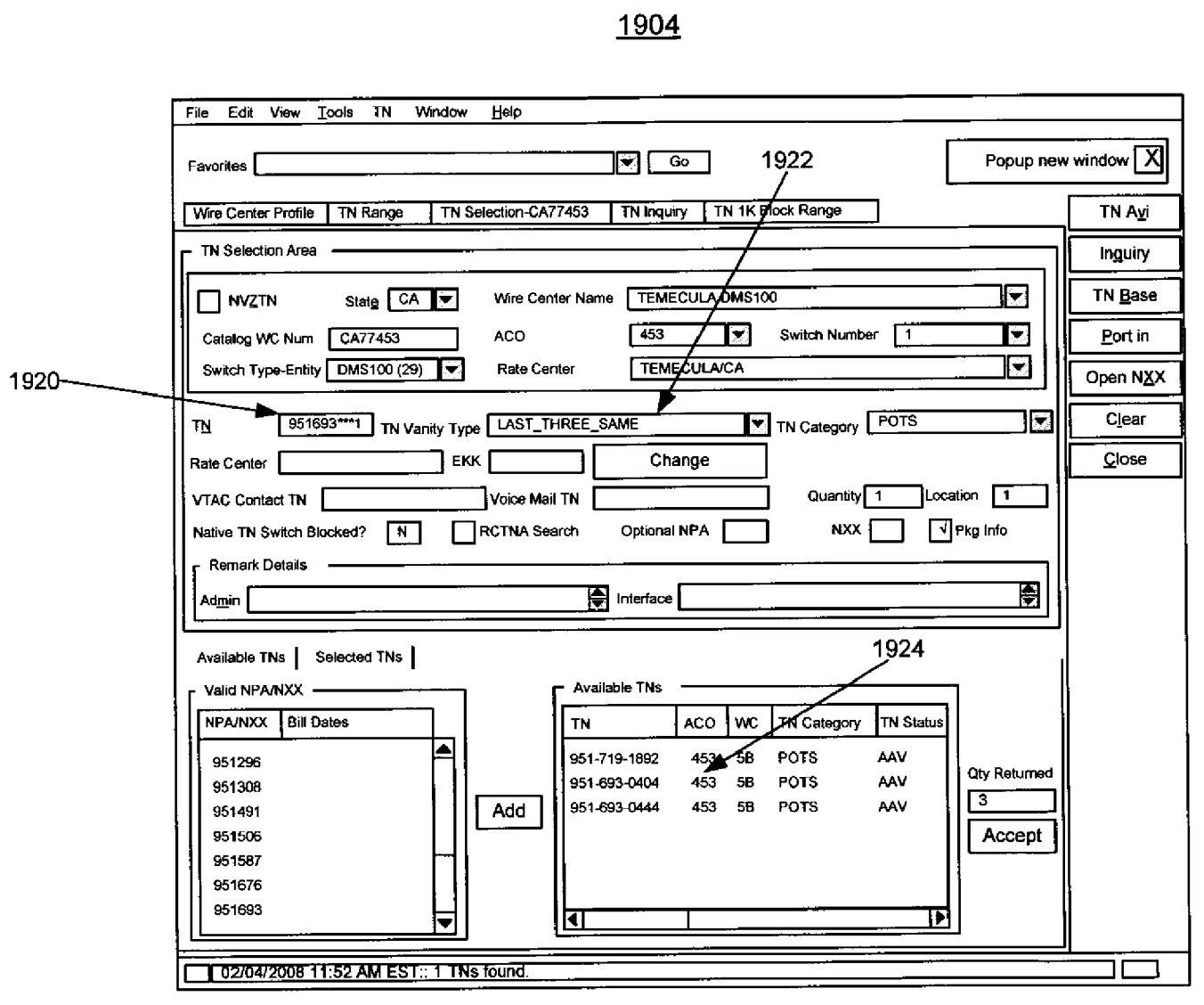

In various embodiments, receiving a request for a telephone number may include generating one or more screen displays as depicted in FIG. 19B. FIG. 19B illustrates exemplary screen displays of a telephone number selection graphical user interface in accordance with exemplary embodiments. In various embodiments, the telephone number management system 102 may be configured to generate and/or output screen display 1904 of a telephone number graphical user interface for a user.

Using these screen displays, the user may search for a telephone number for a customer. As previously discussed, the telephone number management system 102 may be configured to support various types of telephone number requests. For example, the telephone number management system 102 may be configured to support wildcard telephone number searching as shown in data field 1920. In another example, the telephone number management system 102 may be configured to support "LAST_THREE_SAME" telephone number searching as shown in data field 1922. As shown, the screen display 1904 may display one or more available telephone numbers, such as, a telephone number that is not associated with a pattern, a telephone number with a repetitive pattern, and/or a telephone number with the last three digits being the same as shown in display box 1924.

Referring to FIG. 21 again, in block 2104, the method 2100 may include a telephone number selection module 210 applying various search phases and/or applying various search criteria. The first search phase may include searching for a telephone number that is associated with a particular target switch level. The second search phase may include searching for a telephone number that is associated with one or more other switches in the same wire center (e.g., target wire center, etc.) as the target switch. The third search phase (e.g., rate center search, etc.) may include searching one or more other switches associated with the rate center and that are outside of the target wire center.

The telephone number selection module 210 may execute the seven step algorithm (e.g., search criteria) to search for progressively better quality telephone numbers using the rating code. The method 2100 may continue to block 2106.

Figure 17:
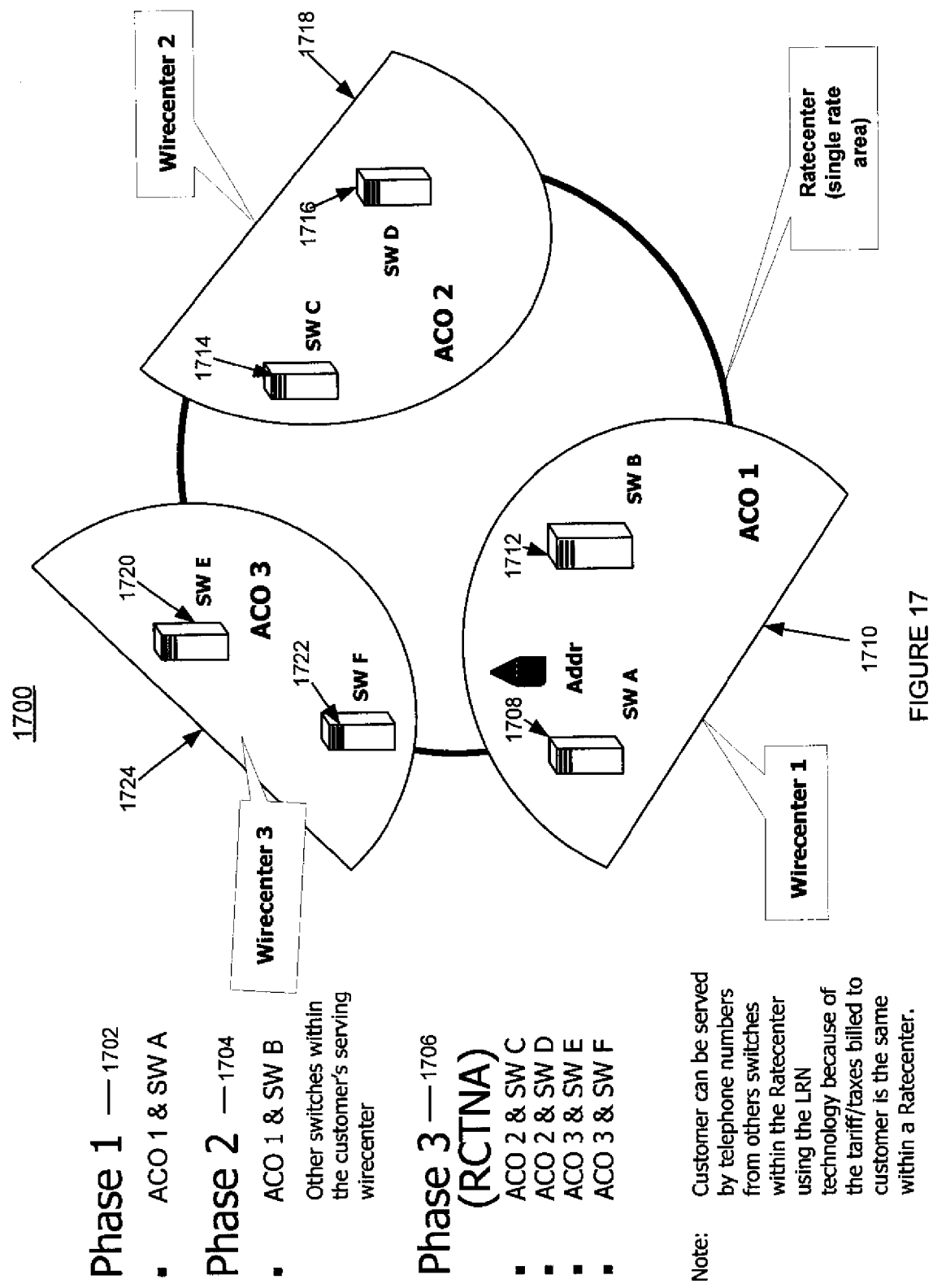
FIG. 17 illustrates an exemplary three phase telephone number selection process in accordance with exemplary embodiments.

In various embodiments, applying various search phases and/or applying various search criteria may include applying the search phases and/or applying the search criteria as depicted in FIG. 17 and/or FIG. 18. FIG. 17 illustrates an exemplary three phase telephone number selection process 1700 in accordance with exemplary embodiments. As previously discussed, searching for a telephone number may include performing three search phases. The first search phase may include searching for a telephone number that is associated with a particular target switch level as shown in Phase one (1) 1702. The second search phase may include searching for a telephone number that is associated with one or more other switches in the same wire center (e.g., target wire center, etc.) as the target switch as shown in Phase two (2) 1704. The third search phase (e.g., rate center search, etc.) may include searching one or more other switches associated with the rate center and that are outside of the target wire center as shown in Phase three (3) 1706.

By way of a non-limiting example, the telephone number management system 102 may employ the three phase search technique as shown in FIG. 17. For example, according to the first search phase, the telephone number management system 102 may search switch A 1708 (e.g., target switch, etc.) that is associated with wire center one (1) 1710 (e.g., target wire center, etc.). If a sufficient telephone number is not located during the first search phase, the telephone number management system 102 may search switch B 1712 that is associated with wire center one (1) 1710 according to the second search phase. If a sufficient telephone number is not located during the second search phase, the telephone number management system 102 may search switch C 1714 and switch D 1716 that are associated with wire center two (2) 1718 and switch E 1720 and switch F 1722 that are associated with wire center three (3) 1724 until a sufficient telephone number is located.

In various embodiments, a user of the telephone number management system 102 may limit the search phases. For example, the user of the telephone number management system 102 may limit the search phases to the first search phase. Accordingly, the second search phase and the third search phase will not be invoked.

FIG. 18 illustrates an exemplary telephone number selection algorithm 1800 in accordance with exemplary embodiments. As previously discussed, within each search phase of the telephone number searching process, the telephone number management system 102 may be configured to search for progressively better quality telephone numbers by executing specific search criteria. For example, the telephone number management system 102 may be configured to search for and/or retrieve telephone numbers associated with a higher rating code (e.g., line number ending with "000") and telephone numbers in sequence groups (e.g., a group of available telephone numbers associated with an incremental sequence) in the event the supply of normal telephone numbers (e.g., telephone numbers not associated with a defined pattern) is low. A rating code may include a rating that that indicates the quality of a telephone number based on the pattern of the last four digits of a ten digit telephone number.

As shown in "Rating Code" 1802, the telephone number management system 102 may utilize four rating codes, such as, rating code one (0001), rating code two (0002), rating code three (0003) and/or rating code five (0005). Rating code one (0001) may include telephone numbers ending with digits of multiples of one-thousand (1000), excluding zero (0000) (e.g., "1000," "5000," "6000," etc.). Rating code two (0002) may include telephone numbers ending with digits of multiples of one-hundred (100), excluding zero (0000) (e.g., "1200," "1300," "1400," etc.). Rating code three (0003) may include telephone numbers associated with a specific pattern excluding telephone number that belong to rating code one (0001) and rating code two (0002), such as, the all same pattern (e.g., "1111," "7777," etc.), the any three same pattern (e.g., "1115," "3833," etc.), the last three same pattern (e.g., "4333," "2999," etc.), the any double pattern (e.g., "2263," "6223," etc.), the double double pattern (e.g., "4455," "7733," etc.), the first three same pattern (e.g., "9993," "2227," etc.), the mirrored pattern (e.g., "6446," "7557," etc.), the repetitive pattern (e.g., "2323," "8484," etc.), the ascending sequential pattern (e.g., "3456," "7890," etc.), and/or the descending sequential pattern (e.g., "7654," "9876," etc.).

As shown in the search criteria 1804, the telephone number management system 102 may execute the seven step algorithm (e.g., search criteria) to search for progressively better quality telephone numbers using the rating code. For example, step 1 may be associated with a rating code of five (5) and may include searching for one or more telephone numbers that are not associated with a pattern and are not associated with a sequence group. Step 2 may be associated with a rating code of five (5) and may include searching for one or more telephone numbers that are not associated with a pattern and are associated with a sequence group of two (2) to nine (9). Step 3 may be associated with a rating code of three (3) and may include searching for one or more good telephone numbers that are not associated with multiples of one-thousand (1000) and multiples of one-hundred (100) and are not associated with a sequence group. Step 4 may be associated with a rating code of three (3) and may include searching for one or more good telephone numbers that are not associated with multiples of one-thousand (1000) and multiples of one-hundred (100) and are associated with a sequence group of two (2) to nine (9). Step 5 may be associated with a rating code of five (5) and may include searching for one or more telephone numbers that are not associated with a pattern and are associated with a sequence group of less than one-hundred (100). Step 6 may be associated with a rating code of three (3) and may include searching for one or more good telephone numbers that are associated with a sequence group of less than one-hundred (100). Step 7 may not be associated with a rating code and may include searching for one or more telephone numbers that are available.

Referring to FIG. 21 again, in block 2106, the method 2100 may include a telephone number selection module 210 retrieving and/or returning a telephone number for the customer.

Figure 19C:
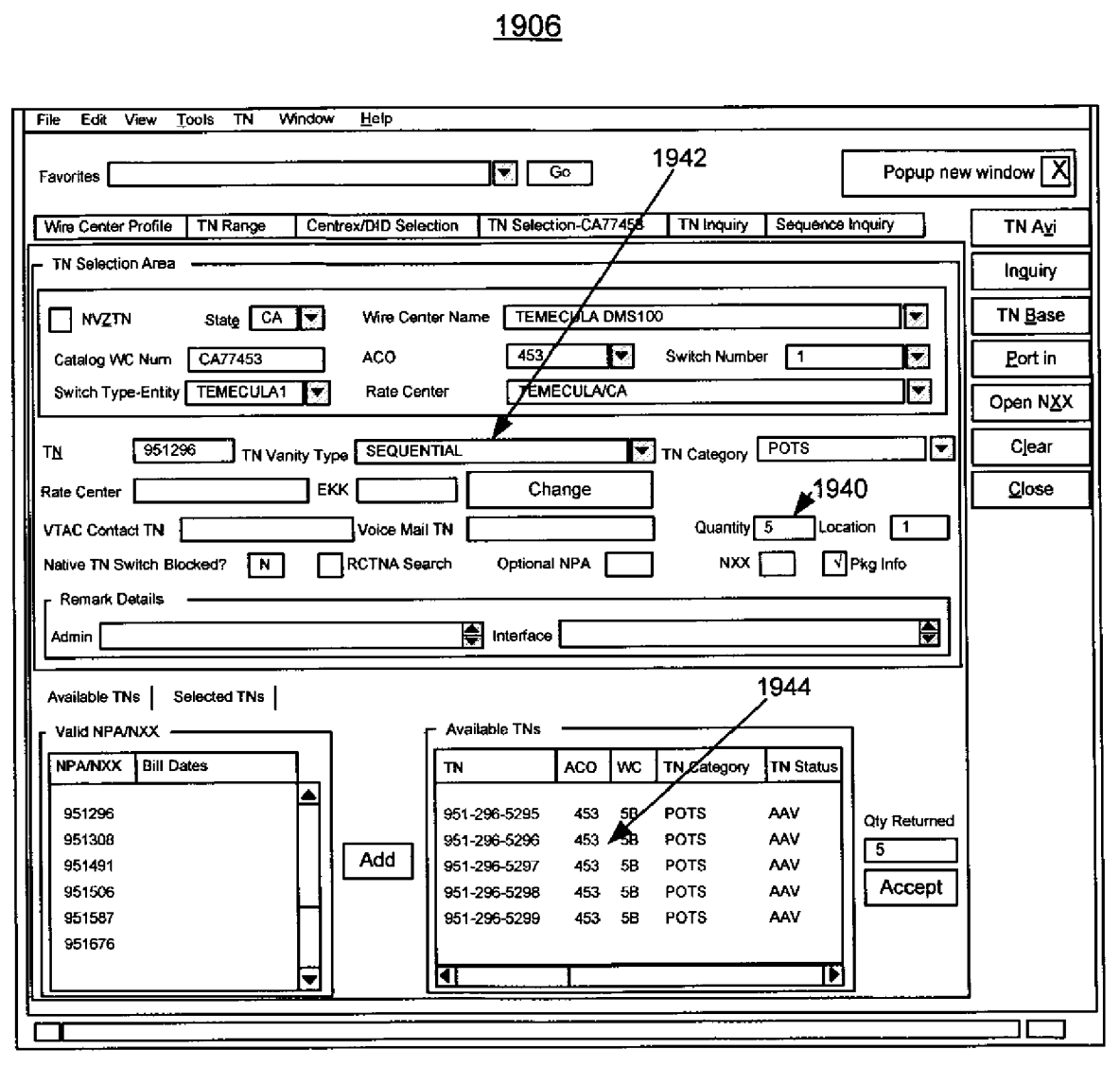

In various embodiments, retrieving and/or returning a telephone number for a customer may include generating one or more screen displays as depicted in FIG. 19C. FIG. 19C illustrates exemplary screen displays of a telephone number selection graphical user interface in accordance with exemplary embodiments. In various embodiments, the telephone number management system 102 may be configured to generate and/or output screen display 1906 of a telephone number graphical user interface for a user.

Using this screen display, the user may view one or more telephone numbers retrieved and/or returned for a customer. For example, a customer may have requested five consecutive telephone numbers as shown in data field 1940 and data field 1942. Accordingly, the telephone number management system 102 may search for, retrieve, and/or return five consecutive telephone numbers as shown in display box 1944. Referring to FIG. 21 again, the method 2100 may then end.

FIG. 19A and FIG. 19D illustrate exemplary screen displays of a telephone number selection graphical user interface in accordance with exemplary embodiments. FIGS. 19A and 19C illustrate exemplary screen displays of a telephone number selection graphical user interface in accordance with exemplary embodiments. In various embodiments, the telephone number management system 102 may be configured to generate and/or output screen displays 1900 and/or 1908 of a telephone number graphical user interface for a user.

In various embodiments, a user may ensure that the telephone number management system 102 is first exhausting K-blocks with the least available telephone numbers by viewing display box 1950 of FIG. 19A. In various embodiments, the a user may view the prior grouping of consecutive telephone numbers by the telephone number management system 102 by viewing display box 1960 of FIG. 19D.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
    storing telephone number inventory data using a database associated with a network;
    receiving, from a user system, a request for telephone number forecast data;
    using one or more computer processors to forecast future telephone number usage based on historical trends in telephone number inventory data;
    determining whether the forecasted future telephone number usage exceeds a predetermined threshold;
    providing, to the user system, a warning if the forecasted future telephone number usage exceeds a predetermined threshold; and providing, to the user system, telephone number forecast data based on at least the forecast of future telephone number usage.

2. The method of claim 1, further comprising receiving on a snap shot of an inventory of telephone numbers on a periodic basis.

3. The method of claim 2, wherein receiving on the snap shot of the inventory of telephone numbers on a periodic basis comprises receiving the snap shot of the inventory of telephone numbers on a monthly basis.

4. The method of claim 2, wherein the periodic basis comprises at least one of a daily basis, a weekly basis, and a biweekly basis.

5. The method of claim 1, wherein receiving, from the user system, the request for telephone number forecast data comprises receiving one or more input parameters.

6. The method of claim 5, wherein one or more input parameters includes at least one of time interval information, level of expansion information, and filter information.

7. The method of claim 1, wherein forecasting future telephone number usage further comprises estimating an amount of telephone numbers needed based on past telephone number usage data.

8. The method of claim 1, wherein providing, to the user system, telephone number forecast data further comprises providing one or more telephone number forecast reports.

9. A computer readable media comprising code to perform the acts of the method of claim 1.

10. A system, comprising:
a database for storing telephone number inventory data associated with managing an inventory of telephone numbers; and
a network element communicatively coupled to the database and a network configured to:
receive request data, from a user system, wherein the request data comprises a request for information relating at least in part to managing an inventory of telephone numbers,
forecast future telephone number usage based on historical trends in telephone number inventory data,
determine whether the forecasted future telephone number usage exceeds a predetermined threshold;
provide, to the user system, a warning if the forecasted future telephone number usage exceeds a predetermined threshold; and
provide, to the user system, telephone number forecast data based on at least the forecast of future telephone number usage.

11. The system of claim 10, wherein the database is further configured to receive a snap shot of an inventory of telephone numbers on a periodic basis.

12. The system of claim 11, wherein being configured to receive the snap shot of the inventory of telephone numbers on a periodic basis further comprises being configured to receive the snap shop of the inventory of telephone numbers on a monthly basis.

13. The system of claim 11, wherein the periodic basis comprises at least one of a daily basis, a weekly basis, and a biweekly basis.

14. The system of claim 10, wherein the network element is further configured to receive one or more input parameters.

15. The system of claim 14, wherein one or more input parameters includes at least one of time interval information, level of expansion information, and filter information.

16. The system of claim 10, wherein the network element is further configured to estimate an amount of telephone numbers needed based on at least past telephone number usage data.

17. The system of claim 10, wherein the network element is further configured to provide one or more telephone number forecast reports.

* * * * *